US012613194B2

(12) United States Patent
Reed et al.

(10) Patent No.: US 12,613,194 B2
(45) Date of Patent: Apr. 28, 2026

(54) DEVICES AND METHODS FOR CHARACTERIZATION AND CONTROL OF BIOPOLYMERS AND SYNTHETIC POLYMERS DURING MANUFACTURING

(71) Applicant: YOKOGAWA FLUENCE ANALYTICS, INC., Stafford, TX (US)

(72) Inventors: Wayne Frederick Reed, New Orleans, LA (US); Michael Felix Drenski, New Orleans, LA (US); Alex W. Reed, New Orleans, LA (US)

(73) Assignee: YOKOGAWA FLUENCE ANALYTICS, INC., Stafford, TX (US)

( * ) Notice: Subject to any disclaimer, the term of this patent is extended or adjusted under 35 U.S.C. 154(b) by 0 days.

(21) Appl. No.: 18/647,486

(22) Filed: Apr. 26, 2024

(65) Prior Publication Data
US 2024/0280498 A1 Aug. 22, 2024

Related U.S. Application Data

(63) Continuation of application No. 16/637,848, filed as application No. PCT/US2018/046311 on Aug. 10, 2018, now Pat. No. 11,971,361.

(60) Provisional application No. 62/543,724, filed on Aug. 10, 2017.

(51) Int. Cl.
| | |
|---|---|
| *G01N 21/85* | (2006.01) |
| *G01N 21/53* | (2006.01) |
| *G01N 21/84* | (2006.01) |

(52) U.S. Cl.
CPC ............. *G01N 21/85* (2013.01); *G01N 21/53* (2013.01); *G01N 2021/8411* (2013.01)

(58) Field of Classification Search
CPC .. G01N 21/85; G01N 21/532; G01N 21/0303; G01N 2021/513; G01N 15/14; G01N 15/0211; G01N 33/18
USPC .................. 356/335–343, 73, 432–440, 410
See application file for complete search history.

(56) References Cited

U.S. PATENT DOCUMENTS

| | | | |
|---|---|---|---|
| 4,543,482 A | 9/1985 | Brenholdt | |
| 6,144,444 A | 11/2000 | Haworth et al. | |
| 6,618,144 B1 * | 9/2003 | Reed ...................... | G01N 30/74 |
| | | | 356/336 |
| 6,653,150 B1 | 11/2003 | Reed | |

(Continued)

FOREIGN PATENT DOCUMENTS

| | | |
|---|---|---|
| CN | 107532992 A | 1/2018 |
| CN | 107003220 B | 4/2021 |

(Continued)

OTHER PUBLICATIONS

Campan Francis "Intelligent Measurement System at the Delivery Point of a Fluid", Feb. 5, 2016, FR 3024545A1 (Year: 2016).*

*Primary Examiner* — Sang H Nguyen
(74) *Attorney, Agent, or Firm* — Polsinelli PC

(57) ABSTRACT

Devices and methods for characterization and control of biopolymers and synthetic polymers during manufacturing. The device may include a body defining a fluid flow path. The body may be configured to receive a process flow liquid such that the process flow liquid may flow through an interior portion of the body. The body may also include a plurality of detectors inserted into said body, each of the plurality of detectors configured to monitor one or more process characteristics.

20 Claims, 14 Drawing Sheets

(56)  References Cited

U.S. PATENT DOCUMENTS

|  |  |  |  |  |
|---|---|---|---|---|
| 6,678,052 | B1 * | 1/2004 | Hanagandi | G01N 21/85 |
|  |  |  |  | 356/440 |
| 11,971,361 | B2 * | 4/2024 | Reed | G01N 21/53 |
| 2004/0004717 | A1 * | 1/2004 | Reed | G01N 35/085 |
|  |  |  |  | 356/338 |
| 2005/0105077 | A1 * | 5/2005 | Padmanabhan | A61B 5/150221 |
|  |  |  |  | 356/39 |
| 2005/0243303 | A1 | 11/2005 | Pettersson et al. |  |
| 2010/0253945 | A1 | 10/2010 | Corbett |  |
| 2010/0294941 | A1 * | 11/2010 | Chuang | G01T 1/2985 |
|  |  |  |  | 250/363.04 |
| 2011/0157586 | A1 * | 6/2011 | McNeil-Watson | G01N 21/51 |
|  |  |  |  | 356/337 |
| 2012/0242993 | A1 | 9/2012 | Schick et al. |  |
| 2013/0100433 | A1 * | 4/2013 | Frose | G01N 30/74 |
|  |  |  |  | 356/343 |
| 2014/0353516 | A1 | 12/2014 | Schick et al. |  |

FOREIGN PATENT DOCUMENTS

|  |  |  |
|---|---|---|
| JP | S59-147241  A | 8/1984 |
| JP | 2004-510976  A | 4/2004 |
| JP | 2016-530524  A | 9/2016 |
| WO | 2016/170681  A1 | 10/2016 |

* cited by examiner

DEVICES AND METHODS FOR CHARACTERIZATION AND CONTROL OF BIOPOLYMERS AND SYNTHETIC POLYMERS DURING MANUFACTURING

CROSS-REFERENCE TO RELATED APPLICATIONS

This application is a continuation of and claims the benefit of U.S. application Ser. No. 16/637,848, filed on Feb. 10, 2020, entitled "DEVICES AND METHODS FOR CHARACTERIZATION AND CONTROL OF BIOPOLYMERS AND SYNTHETIC POLYMERS DURING MANUFACTURING," which is a National Stage Entry of PCT/US2018/046311, filed on Aug. 10, 2018, entitled "DEVICES AND METHODS FOR CHARACTERIZATION AND CONTROL OF BIOPOLYMERS AND SYNTHETIC POLYMERS DURING MANUFACTURING," which claims priority to from U.S. Provisional Application No. 62/543,724, entitled "DEVICES AND METHODS FOR CHARACTERIZATION AND CONTROL OF BIOPOLYMERS AND SYNTHETIC POLYMERS DURING MANUFACTURING," filed on Aug. 10, 2017, each of the foregoing applications is expressly incorporated by reference herein in their entireties.

FIELD

The present application is directed to the characterization and control of biopolymers and synthetic polymers during manufacturing. Specifically, the present disclosure is directed to devices and methods that include inflow and submersible multi-detector instrumentation for monitoring and control of biopolymers and synthetic polymers during manufacturing.

BACKGROUND

During the manufacturing of biopolymers and synthetic polymers it is desirable to monitor the polymer characteristics and reaction parameters as they evolve so that product specifications and process optimization may be achieved by controlling process variables during production.

Devices and methods for characterization and/or control of biopolymers and synthetic polymers during manufacturing are desirable.

BRIEF DESCRIPTION OF THE DRAWINGS

Embodiments of the present application are described, by way of example only, with reference to the attached Figures, wherein.

Figure 1A:
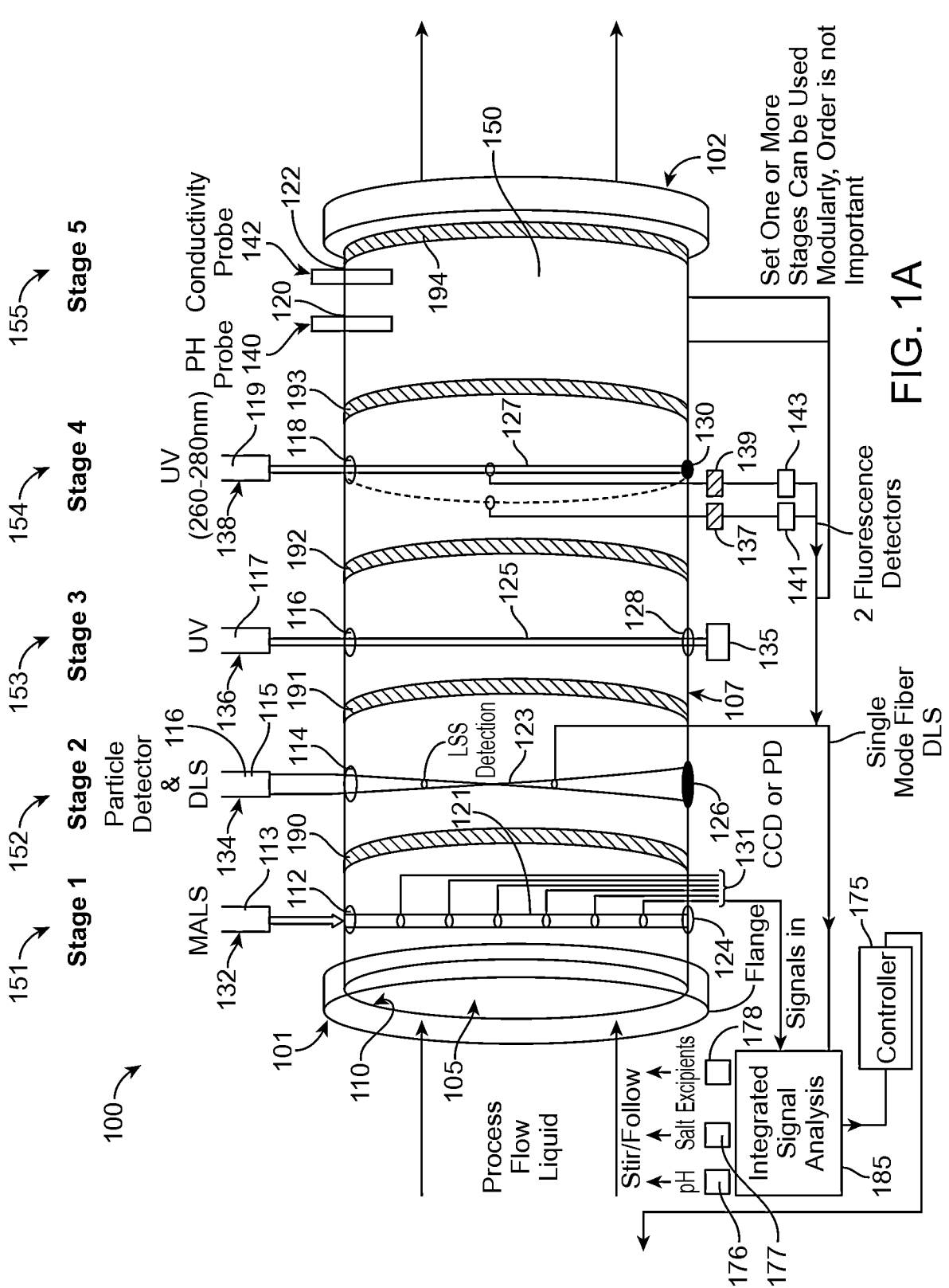
FIG. 1A illustrates a device that includes five detector stages, according to an example embodiment of the present disclosure.

It should be understood that the various aspects are not limited to the arrangements and instrumentality shown in the drawings.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented. The term "coupled" is defined as connected, whether directly or indirectly through intervening components, and is not necessarily limited to physical connections. The term "communicatively coupled" is defined as connected, either directly or indirectly through intervening components, and the connections are not necessarily limited to physical connections, but are connections that accommodate the transfer of data between the so-described components. The connections can be such that the objects are permanently connected or releasably connected. The terms "comprising," "including" and "having" are used interchangeably in this disclosure. The terms "comprising," "including" and "having" mean to include, but are not necessarily limited to, the things so described.

The term "polymer" is used as a general term to encompass all naturally occurring and synthetic polymers, as well as assemblies resulting from polymers interacting with each other, with other types of polymers, nanoparticles and other agents. Such assemblies can be of a covalent nature, or non-covalent nature, including supramolecular assemblies. The more specific term "biopolymer" refers to any naturally occurring polymer, or biopolymeric assembly, including those that may also contain modified or synthetic components, or formulations involving biopolymers, excipients, salts, buffers, and other natural or synthetic components. The term includes, but is not limited to, proteins, including monoclonal antibodies and therapeutic drug proteins, vaccines, polysaccharides, polynucleic acids (e.g. RNA, DNA), lipids and lipid structures, associations of the latter types of biopolymers, such as proteoglycans, lipid vesicles and liposomes, where the latter may contain other biopolymers or synthetic agents, such as surfactants, synthetic polymers, and nanoparticles. In this definition, the term "synthetic" refers to such substances that are created by humans and do not occur naturally. The term "synthetic polymer" includes polymers of any composition (i.e. homopolymers, copolymers, terpolymers, polypeptides, polypeptoids, etc.) and architecture (e.g. linear, branched, star, comb, circular, dendrimer, cavitand, etc.), produced by whatever means is available including, but not limited to chain growth, step growth, living polymerization, etc., and includes the aforementioned assemblies resulting from these. The term 'polymer containing liquid' refers to any liquid, such as water, aqueous solutions, organic solvents, and ionic liquids, in which polymers, according to the above definition, are dissolved or suspended.

The term "manufacture" refers to the processes involved in producing polymers in whatever form is desired, whether it be for laboratory, pilot, or full scale production quantities. Processes involved in manufacture can be those that occur both unintentionally and intentionally. Processes which occur unintentionally normally have undesired effects and one object of the device and methods herein is to eliminate or minimize unwanted processes. For example aggregation of proteins during the manufacture of therapeutic proteins is an unwanted process that needs to be eliminated or minimized. One use of the device is to monitor and possibly control aggregation during manufacture. Degradation of biopolymers during processing, such as hydrolysis of polymer chains that reduce the molecular weight, may be either desired or undesired and one object of the device is to monitor and possibly control degradation during manufacture. Intentional modification processes can include those that derivatize a biopolymer, such as hydrolyzing neutral polysaccharides into soluble form (e.g. oxidation of neutral guar gums, carboxylation of cellulose to produce carboxy-cellulose), or adding functional side groups or endgroups to biopolymers, such as polyethylene glycol, amino acids, polypeptides, or polypeptoids.

The term "biopolymer processing stream" refers to any series of steps involved in the manufacture of a biopolymer. For example, a biopolymer processing stream may include: (1) A purification process where a biopolymer drug substance is separated from biological cells or other biological media; (2) a batch compounding tank where a drug substance is introduced and various liquid and chemical components are added, such as water, salts, pH modifiers, stabilizers, such as arginine, sucrose, or surfactants, such as polysorbate, where the materials reside for a certain amount of time and where some form of agitation or mixing may occur; (3) the material from the compounding tank may then flow, via active pumping, gravity, or other means, into a second compounding vessel where further materials are added; (4) flow from this vessel through a filtration system; and (5) from the filtration system into vials or syringes, as final drug product.

The term "light" refers generally to any electromagnetic radiation in the UV, visible and near IR portions of the spectrum. The term "light scattering" refers to the elastic, quasi-elastic, or Raman scattering of incident electromagnetic radiation in the UV, visible, or near RI.

The term "fluorescence emission" refers to light of any wavelength emitted after radiation in the UV or visible spectrum is absorbed by a molecule. This term implicitly includes emissions often termed "luminescence" and "phosphorescence."

The term "detector" refers to a detector of any type described herein. Generally, the term "detector" is described in terms of its function. Hence, if multiple scattering angles are used for the total intensity light scattering these are all part of the same type of detector even though multiple scattering signals are generated. Total intensity scattering can use UV, visible, or near IR incident light. In the case of incident UV, visible, or near IR light, the detection of its intensity loss at zero scattering angle is a means of determining concentration, turbidity, or other characteristic derivable from intensity attenuation upon light passage through the cell. This is an intensity loss detector which is different than a light scattering detector. In the case of incident UV or visible light causing fluorescence, the use of notch filters or cutoff filters for fluorescence detection constitutes a fluorescence stimulation and detection device, and is a different type of detector from the intensity loss detector, even if the very same UV or visible light source is used for both detectors. In the case of characterizing light scattering spikes from particulates in the flow stream, in order to determine particle number concentration and other characteristics, such as particle size distribution, such a device is a particle characterization detector. Even if the same UV, visible, or near IR incident light source is used this particle characterization detector is different from the total scattering intensity, intensity loss, and fluorescence detectors. A flow viscometer uses a differential pressure transducer and is a viscosity detector, different from the previously listed detectors. The use of flow viscometers in conjunction with Poisseuille's law for the relationship between flowing fluid viscosity and pressure drop across a tube is a well-known practice. A DLS detector normally detects scattered light at a single angle, although may also be used in multi-angle mode, and the scattered light is processed with an autocorrelator. Hence, a DLS detector is distinct from the above detectors that use UV or visible light, even if it shares the incident sources light with one or more of these detectors.

The term "early detection of aggregates" means that one or more detectors is capable of monitoring the onset of aggregation at a very early stage, typically of a protein or other biopolymer, but also in the case of synthetic polymers. For example, "early stage" can refer to a specific amount of aggregation above a starting value of $M_w$ or a certain value of n: e.g., once $M_w(t)$ reaches $1.01M_w(t=0)$ early aggregate detection has occurred. In this non-limiting case, once $n=100$ particles/$cm^3$ at or above about 100 nm in size, early particulate detection has occurred.

The term "control" in the context of the presently disclosed devices and their uses can mean: (1) active manual control, where an operator uses the information provided by the device to make control decisions on process variables affecting the manufacturing process, such as changing temperature, flow rates, mixing, reagents flows, etc.; (2) computer assisted active manual control, where the information from the device is processed and interpreted by the device itself (i.e., the device contains model based or other types of computations) and informs the operator of what control actions to take in terms of process variables; and (3) fully automated active feedback control in which the device interprets the information it produces concerning the manufacturing process characteristics, makes decisions concerning changes in process variables, and carries out these changes via automated interfaces; e.g., temperature, flow rates, additions of reagents, mixing, etc. can all be controlled completely automatically in this fashion.

The present disclosure provides for devices and methods capable of providing continuous characterization of biopolymers and synthetic polymers in liquids during manufacture. The presently disclosed devices and methods may be used to monitor one or more of the following characteristics: the concentration of the biopolymer, the unfolding of the biopolymer in time, the change of the weight average molecular weight $M_w$ of the polymer in time, whether due to degradation, aggregation, polymerization, or deliberate modification process, the rate of aggregation, degradation, polymerization, or modification of the polymer, the mechanism causing the molecular weight of the polymer to change, the number concentration of subvisible particles, if any, as they evolve, early detection of any changes in molecular weight, the fraction of polymer mass in aggregated form, total solution viscosity, and polymer intrinsic viscosity.

The presently disclosed devices may include one or more types of detectors, including but not limited to, a single angle total intensity light scattering device, a multi-angle total intensity light scattering device, a particle characterization device, a concentration determination device, a fluorescence detection device, a refractometer that can be used to measure total solute content, a flow based viscometer, a dynamic light scattering device, a pH detector, and a conductivity probe.

Additionally, the presently disclosed devices may include a single angle total intensity light scattering device or a multi-angle total intensity light scattering device configured to determine the weight average molecular weight $M_w$ of a liquid containing polymers. The presently disclosed devices may also include a single angle total intensity light scattering device or a multi-angle total intensity light scattering device configured to detect and/or characterize light scattering spikes due to sub-visible particulates. The presently disclosed devices may also include a UV light source passing through the biopolymer solution with intensity detection that permits determining concentration of the biopolymer. In at least some instances, the UV light source passing through the polymer containing liquid may be configured to excite and detect fluorescence, the fluorescence emission being detected at two wavelengths or more, or two wavelength ranges or more. In at least some instances, the device may further include detectors or sensors configured to measure or determine pH and conductivity.

The presently disclosed devices and methods may be used to exercise quality control during polymer production, including polymer modifications, means of controlling process variables during production to achieve desired final product specifications, and optimizing processes used in production. According to the present disclosure, the devices may be configured to manipulate process variables by active manual or automatic feedback control include flow rate, stirring rate, pH, ionic strength, hydrolysis agents, molecular modification agents, content of stabilizers and excipients such as polysorbate, arginine, and sucrose.

In at least some instances, one or more of the presently disclosed devices may be coupled directly into the flow path of a polymer processing flow stream and the entire contents of the polymer processing flow stream flows through the device. In other instances, a portion of the polymer processing stream flows directly through the device, but there is no net extraction or loss of fluid from the biopolymer processing stream; i.e. the portion of the processing stream that passes through the flow path rejoins the entire processing flow stream. In some cases, a portion of the polymer processing stream is diverted through the device and the exiting content is not returned to the polymer processing stream. In this case, manipulation of the stream such as dilution, stirring, exposure to radiation, adding chemical agents, etc. can be carried out. In at least some instances, one or more of the presently disclosed devices may be submersible in a vessel that exists in the apparatus of the polymer processing. In some cases, one or more of the presently disclosed devices can be used as all or part of the detection portion of an ACOMP system (automatic continuous online monitoring of polymerization reactions), wherein a generally very small portion of the process fluid is continuously sampled, diluted and/or conditioned, and flowed continuously through the detection apparatus.

According to at least one aspect of the present disclosure, the device may include a single tube which may be configured to fit directly into tubular flow paths of tubing of the same or different diameters, and which can also be immersed directly into a batch process without flow. An example of the latter is a compounding tank containing a liquid for formulating proteins during biopharmaceutical production. The liquid is at rest, or stirred, during the compounding process, but otherwise does not flow into or out of the tank during the process. Another case where the device can be immersed is in a vessel in which there is inflow and outflow from the vessel in a continuous process. The latter type of continuous process is used frequently in the production of synthetic polymers. In the case of immersion into a vessel containing liquid at rest or being stirred, the device can provide all the characteristics that the device provides when inserted into a process flow path. The exception is in the case of liquid at rest, in which case the viscometer will not provide a signal, but all the other detectors will provide signals, yielding the associated characteristics. The device can be used for both biopolymer and synthetic polymer manufacturing processes.

In at least some instances, the polymer liquid containing portion of the device can have the form of a tube whose inner and/or outer diameters can match the inner and/or outer diameters of a flow stream into which the device can be directly inserted with appropriate tubing couplings. In this way the device will not alter the flow path or cause any problems due to constricting or enlarging the flow path. The tube may be inserted into any flow path desired by using appropriate inner and/or outer diameters. Hence, the device is universally adapted to any tubular flow path. While tubular cross sections are generally circular, the device can also be made with other cross sectional shapes, such as ellipses, if such is necessary to insert into a flow path of such geometry. Such a device fitting into the flow path with identical diameters causes no perturbation to the flow, and can thus be considered a non-perturbative device. An example of a perturbative device would be one where the device flow path is of a different dimension than the process flow path, which can cause turbulence, shear, and product instability. An example of such a perturbative situation could be where a process flow stream in a ¼" tube is constricted to flow through a scattering flow cell whose diameter is far smaller than this, for example of the type of scattering flow cell produced by Wyatt Technology Corporation.

The tubular polymer liquid containing portion of the device, which is insertable into the flow path, can be separable from the optical components used for introducing electromagnetic radiation into the flowing polymer containing liquid and detecting scattered, transmitted, and emitted radiation from the polymers in the polymer containing liquid. Hence, the tubular polymer liquid containing portion can be disposable, and a new such tubular polymer liquid containing portion can replace it in the same flow path. This can be important, or even necessary, where sterility is required. The disposable tubular polymer liquid containing portion can be relatively inexpensive compared to the said optical components.

In cases where the device is immersed in or submerged in a biopolymer containing liquid the disposable tubular polymer liquid containing portion of can be disposed of after each use and the optical components of the device can be encased in a sterile sheath, which sheath can be disposed of after each use. Hence, the optical components of the device are never in contact with the biopolymer containing liquid and can hence be used with a new, disposable tubular polymer liquid containing portion and disposable sheath upon each use.

In some cases, the portion of the device in contact with biopolymers can be made of, or coated with, a biocompatible material. For example, in handling protein drugs the Food and Drug Administration (or their foreign equivalents) may require specific materials. In some instances, the optical components can be inexpensive enough that the entire device is disposable after use, whether used for direct insertion into a flow path or for immersion into a biopolymer containing fluid. Both the disposable tubular flow portion and the optical components can be sterilized before use (or after use if not disposed of), as required.

According to at least one aspect of the present disclosure, the device may be configured to measure or determine one or more of the following characteristics of polymers, including biopolymers and synthetic polymers, during processing: molecular weight and molecular weight distribution, intrinsic viscosity, total solution viscosity, biopolymer concentration, number concentration of particulates, dimensions of particulates, degrees of functionalization, amount of aggregation, amount of degradation, conformational state of the biopolymers, association and disassociation of biopolymeric structures, including supramolecular assemblies and interactions with nanoparticles and other agents, whether synthetic or biological, that lead to formation of nano- and microstructures. For instance, fluorescent probes are often added to self-assembling systems and changes in fluorescence occur upon self-assembly and disassembly. The presently disclosed devices can detect these events.

According to at least one aspect of the present disclosure, the presently disclosed devices and methods may be used in the processing of therapeutic proteins. In such cases, a drug substance may be produced 'upstream' in the manufacturing process, where cell culture, protein isolation and purification have been performed. Once the drug substance is produced, a method for preparing the final drug product may include compounding of the drug substance with solutions, acids, bases, buffers, excipients, and stabilizers, to produce the final drug product at a desired concentration. The compounding step may occur in single or multiple vessels. The final drug product may then be filtered and loaded into vials or syringes. Parameters during this processing that may be monitored include concentration of the protein in the solution, $M_w$, viscosity of the protein containing solution, protein stability in its native state, and the presence and evolution of particulates during these steps. Proteins can easily be destabilized by factors such as temperature, flow, shear, mixing, exposure to different materials (e.g. metals, glasses, plastics, ceramics), and filtration, which lead to unfolding of the native structure, followed by aggregation. It is a major concern of protein drug manufacturers to eliminate or minimize particulate content in their final drug products.

The characteristics measured continuously by the device can be used to form quality control criteria for decision making during the processing of the drug product. If one or more of established criteria is violated then the process may be stopped so that corrective action can be taken and the process later resumed, or an entire volume of liquid drug product may need to be rejected. This also applies continuously at the filling stage. Because the characteristics that form the criteria are continuously monitored it is possible to reject intermittent portions of the drug product without stopping the processing and filling of vials or syringes. If the fill system is so automated that filling cannot be intermittently stopped, individual vials or syringes can be rejected based on transiently violated criteria. Characteristics which the device can measure, upon which quality control criteria can be formed, include any one or combination of the following: $M_w$, $R_g$, concentration of the biopolymer, unfolding of the biopolymer in time, change of molecular weight of the biopolymer in time, conformational change of the biopolymer, total solution viscosity, biopolymer intrinsic viscosity, biopolymer radius of gyration, degradation or aggregation, rate of aggregation or degradation of the biopolymer, mechanism causing the molecular weight of the biopolymer to change, number concentration of subvisible particles, early detection of changes in molecular weight, presence of optically anisotropic or large particles, number concentration of optically anisotropic or large particles, and the fraction of biopolymer mass in aggregated form. For example, if a certain relationship of $M_w$ and $R_g$, such as their product, is reached this would indicate an unacceptable level of aggregation and drug product with that criterion would not be distributed for patient use. Similarly, as non-limiting examples, the number density of particles, the number density of optically anisotropic and large particles, the ratio of fluorescence to concentration, viscosity, can be used alone or in combination to form quality control criteria.

In at least some instances, the presently disclosed devices may be configured to be immersed in compounding tanks to measure protein concentration, weight average molecular weight $M_w$, number concentration of particulates, n, and distribution of particle sizes. In other instances, the presently disclosed devices may be configured to be inserted into flow paths and to measure protein concentration, weight average molecular weight $M_w$, number concentration of particulates, n, and distribution of particle sizes, as well as solution viscosity. In such cases, the device may be configured to measure these characteristics sterilely, disposably, and without disturbing the process flow in any way.

Positions in the process flow path can be between compounding vessels, between compounding and filtration stages, after filtration stages, and in the final filling stage. As regards the compounding stage, where mixing occurs, the detector for $M_w$ is extremely sensitive to even small changes in $M_w$ (typically, 1% changes in $M_w$), which signals the onset of aggregation, and the particle concentration detector is sensitive to any particulates being formed (above roughly 100 nm), as it detects light scattering spikes due to individual particulates. Detecting changes in $M_w$ and particle concentration n (particles/cm$^3$) can lead to process control operations, such as changing the intensity or type of mixing, changing temperature, adding stabilizers, or otherwise changing solution conditions in the compounding. Meanwhile, the concentration detection can be used to control the addition of liquid in the compounding vessel to achieve the desired concentration to high accuracy. Fluorescence detection can be used to determine if protein unfolding is occurring during compounding (the unfolding may or may not lead to aggregation, depending on the particular system, so this is a separate measurement for protein conformational stability). When the material is pumped or allowed to flow from the compounding vessel another of these devices inserted directly in the flow line will measure the same properties, thus revealing the final characteristics of the drug product after the compounding process. The drug product may flow into one or more further vessels for additional formulation or refinement steps before going through final filtration and filling. Among other factors, final drug product viscosity can be determined and controlled.

In the filtration stage, connecting the device after the filtration will indicate whether the filtration is causing protein instability, via fluorescence, $M_w$ and n monitoring. The monitoring signals can lead to control of such parameters as flow rate and temperature, and also signal whether the filter is damaging the drug product and needs to be changed out before the filtration process continues. Since filtration is known to sometimes cause aggregation of the drug product the device can save entire lots of expensive drug product from being ruined.

In the final filling stage, whether into syringes or vials, the device can assess the quality of the drug product, again, in terms of $M_w$, n (# of particles/cm$^3$), degree of unfolding, concentration, and viscosity. Drug product being loaded into a vial, syringe, or other vessel can be continuously quality controlled, and any material not meeting the required specifications for any combination of $M_w$, n, unfolding, concentration, and viscosity, can be rejected; i.e. because of its continuous monitoring, the device can actually determine, vial by vial, syringe by syringe which ones are acceptable and which ones are not. The acceptance or rejection of vials or syringes could also be made for groups of vials or syringes, instead of individually. This can lead to safer drug products for patients and also avoid costly legal complications for the manufacturer. In current practice, vials or syringes are normally only spot checked from the production lot; e.g. some vials from the beginning, middle, and end of a production run.

According to at least one aspect of the present disclosure, the presently disclosed devices may be used to signal when a target particle concentration of a manufacturing protocol is reached. In at least some instances, the presently disclosed devices may monitor inline filters. In such cases, the device comprises inline filters that must be rinsed before use and the device configured so as to monitor the concentration of particulates emanating from the filter and how these concentrations of particulates decreases in time as the filter is rinsed. In this way a target concentration for particulates can be established as part of the manufacturing protocol and the device will signal when the target concentration is reached and the filter ready for use.

According to at least one aspect of the present disclosure, the presently disclosed devices may be used in the derivitization of both synthetic polymers and biopolymers. In such cases, materials such as cellulose, guar gum, gum Arabic, and many alginates and bacterial polysaccharides may be modified to achieve specific end product properties. An example is the hydroxylation or methylation of cellulose to produce a water-soluble product, often for the purposes of viscosity modification. Another is the modification of guar to make it water soluble for personal care and energy recovery purposes.

In at least some instances, one or more of the presently disclosed devices may be configured to be immersed in a vessel used for modification, or in associated flow processes, can be used to determine the degree of modification and state of aggregation or degradation. For example, a synthetic polymer, such as polyacrylamide, can be hydrolyzed by sodium hydroxide to convert it into an electrically charged polymer with carboxylate groups. As polyacrylamide is processed from an electrically neutral to an electrically charged polymer its viscosity increases and its light scattering decreases. Particulates that form during the process can also be monitored. Such signals can lead to control of the process, indicating the degree of modification, and whether conditions such as temperature, pH, or other should be changed, and when the process is complete.

FIG. 1A illustrates a device that includes five modular stages, according to an example embodiment of the present disclosure. The device 100 includes a body 150 that defines a fluid flow path 105 capable of receiving a process flow liquid such that the process flow liquid may flow through an interior portion 110 of the body 150. In at least some instances, the fluid flow path 105 may be an inner bore of body 150. The body 150 also has a first end 101 and a second end 102. The first end 101 may be configured to receive a process flow liquid and the second end 102 may be configured to permit the exit of the process flow liquid from the interior portion 110 of body 150.

Device 100 further includes one or more apertures in body 150, each aperture configured to receive a detector capable of monitoring one or more parameters occurring in the process flow liquid. As depicted in FIG. 1A, body 150 of device 100 includes apertures 112, 114, 116, 118, 120, and 122 configured to receive a corresponding one of detectors 132, 134, 136, 138, 140, and 142. Detectors 132, 134, 136, 138 comprise light sources 113, 115, 117, 119. Such light sources may be lasers or LEDs (light emitting diodes). Light sources 113, 115, 117, 119 are configured to produce a light or laser beam comprising detection paths 121, 123, 125, 127, respectively, through the fluid flow path 105 such that the characteristics of process flow liquid moving through detection paths 121, 123, 125, 127 may be determined by a respective one of detectors 132, 134, 136, 138. As shown in FIG. 1A, device 100 includes MALS light source 113, particle characterization detector light source 115, UV light source 117, and fluorescence UV light source 119. Detector 134 may optionally include an additional DLS light source 116. Device 100 may also include a depolarized scattering detector stage. In at least some instances body 150 may also include one or more of apertures diametrically opposed to a corresponding one of the apertures in order to provide an exit point for one or more detectors or one or more beams emanating from the light sources, or to provide access to additional components coupled with the detectors, or to provide an additional pathway by which a detector may be communicatively coupled with a device or component exterior to body 150, such as a controller or signal processor, or to provide a termination device for the light source, such as a beam dump. In some instances, one or more of the apertures may have a beam stop, such as beam stops 126, 130, inserted in an aperture.

As depicted in FIG. 1A, body 150 also includes apertures 124 and 128 diametrically opposed to a corresponding one of apertures 112 and 116, allowing detector 132 and 136, and/or beams from corresponding light sources 113 and 117, to pass through the fluid flow path 105 and exit the body 150 on the opposite side or to provide detection paths 121, 125 through the fluid flow path 105 that is in communication with detector elements 131, 135 on the exterior 107 of body 150. As depicted in FIG. 1A, detection element 131 is a set of detection fibers configured to detect the scattered light for the corresponding light scattering detector 132. Body 150 may also include beam stops, such as beam stops 126, 130, diametrically opposed to one or more apertures, such as corresponding apertures 114, 118. In some instances, beam stops 126, 130 may be replaced by exit apertures.

One or more of the detectors corresponds to a detector stage configured to detect, measure, or monitor one or more process characteristics or conditions. As depicted in FIG. 1A, device 100 includes five detector stages 151, 152, 153, 154, 155. Detectors 132, 134, 136, and 138 correspond to detector stages 151, 152, 153, and 154, respectively, while detectors 140 and 142 correspond to the fifth detector stage 155. The presently disclosed devices may include any number of stages. The order of stages is not important. In at least some instances, each of detector stages 151, 152, 153, 154, 155 may be, as depicted in FIG. 1A, modular detector rings that may be stacked together. As shown in FIG. 1A, modular detector rings 151, 152, 153, 154, 155 are attached to one another by connection means 190, 191, 192, 193. Connection means 190, 191, 192, 193 may be any connections means that allows the modular detector rings 151, 152, 153, 154, 155 to interlock or attach sufficient to provide a shared fluid flow path 105. In at least some instances, connections means 190, 191, 192, 193 comprise a releasable connection means configured to releasably attach modular detector rings 151, 152, 153, 154, 155. In at least some instances the fluid flow path 105 defined by attached modular detector rings 151, 152, 153, 154, 155 is an uninterrupted or unperturbed fluid flow path 105. The connection means 190, 191, 192, 193 may include, but are not limited to, means for slipping, bolting, snapping, or interlocking the modular detector rings 151, 152, 153, 154, 155 together. The modular detector rings 151, 152, 153, 154, 155 are separable so that any number or type of modular detector rings may be selected according to the application. In this way, device 100 is customizable to the application by selection of one or more modular detector rings, such as modular detector rings 151, 152, 153, 154, 155.

As depicted in FIG. 1A, light source 113, corresponding to the first detector stage 151, is the incident source for a total intensity light scattering detector such as a single angle or MALS (multiple angle light scattering). Light source 113 has a wide laser beam (e.g. 100 microns) and multiple detection angles. It can use CCD or photodiode (PD) detection. High speed detection is not required, so, for example, a CCD working at a maximum frequency of 10 Hz is adequate, and often 1 Hz and slower is adequate. Total intensity light scattering gives the time dependent weight average molecular weight, $M_w(t)$, and also $M_w(t)/M_o$, aggregation rates, early detection of changes in $M_w(t)$ and $M_w(t)/M_o$, and mechanistic information on causes of changes in $M_w(t)$ and $M_w(t)/M_o$. Where multi-angle extrapolation is used it also gives root mean z-averaged squared radius of gyration, $R_g$, and a model-based estimate of concentration of aggregates, if any. $M_o$ is the molecular weight of a biopolymer in its native state; i.e. before any aggregation, degradation, or molecular modifications. Preferably, the incident light is linearly polarized with the polarization direction (i.e. the electric field direction) parallel or antiparallel to the cylindrical axis of the device. In this case the Scattering Plane, i.e. the plane in which maximum scattering occurs is perpendicular to the flow, and scattered light detection fibers arrayed around the circular cross-section are in the scattering plane. If a depolarized scattering detector is added then the polarization direction of the incident light is perpendicular to the cylindrical axis of the device and the detection of depolarized light scattering is optimally made in the direction of polarization of the incident beam; i.e. the detection means will be on the OCT body, mounted at 90° with respect to the incident beam, and is parallel or anti-parallel to the direction of polarization. The function of the depolarized scattering detector is to detect the occurrence of optically anisotropic or large particles (those approaching and exceeding the wavelength of the incident light) via depolarized scattering intensity. The ratio of the depolarized to polarized scattered intensities is a measure of the amount of optical anisotropy or size of large particles. Sources of optical anisotropy in small particles can include, but are not limited to crystal or partial crystal structure in the particle, even for spherically symmetric particles, and possible optical anisotropy associated with morphological anisotropy, such as rodlike or fibrillar protein aggregates. The detection for this need not be fast, and a CCD working at a maximum of 100 Hz can suffice to obtain these data continuously.

Detector 134, as depicted in FIG. 1A, includes a light source 115 that provides the incident source to the second detector stage 152. As shown in FIG. 1A, second detector stage 152 includes a detector 134 comprising a particle characterization detector and a dynamic light scattering (DLS) detector, however detector 134 may comprise only a particle characterization detector in at least some instances. In cases in which detector 134 comprises a DLS detector, detector 134 also includes a DLS light source 116, as shown in FIG. 1A. Alternatively, the DLS detector and the particle characterization detector may be separated into different stages. In such cases, the DLS detector, comprising a DLS light source, may comprise a separate stage. Detector 134 includes a highly focused laser beam to produce a very small scattering volume. For the particle characterization detector the detection is fast enough on one optical fiber to distinguish and characterize individual sub-visible particles passing through the scattering volume in order to yield the number of sub-visible particles per unit volume, and to provide information on particle size distributions. Usually a sampling frequency of at least 100 Hz or higher is needed, although some information can still be obtained at slower sampling rates.

The size of the scattering volume $V_s$ is critical for this application since the probability that there are no particles in $V_s$ when the average concentration in the entire polymer liquid containing volume of the device is n particles/volume is $\exp(-nV_s)$. (The polymer liquid containing volume of the device is typically many orders of magnitude larger than $V_s$). Hence, a rough rule of thumb is that n should not be too much larger than $V_s$, otherwise there is high probability of two or more particles in $V_s$. Hence, to resolve particles when $n=10^4$ particles/cm$^3$ would require $V_s \sim 10^{-4}$ cm$^3$. The size of the particles that can be resolved by this method depends purely on the optical design. A typical system can detect light scattering spikes from particles starting at roughly 100 nm. Preferably, the incident light is linearly polarized with the polarization direction (i.e. the electric field direction) parallel or antiparallel to the cylindrical axis of the device. If a depolarized scattering particle characterization detector is added then the polarization direction of the incident light is perpendicular to the cylindrical axis of the device and the detection of depolarized light scattering is optimally made in the direction of polarization of the incident beam; i.e. the detection means will be on the OCT body, mounted at 90° with respect to the incident beam. The function of the depolarized scattering particle characterization detector is to detect, count and possibly characterize via depolarized light scattering spikes. The ratio of the depolarized to polarized scattered intensities is a measure of the amount of optically anisotropic or large particles. The detection for this needs to be similar to that of the light scattering particle characterization device, and detection of at least 100 Hz or higher is preferred.

The MALS detector stage 151 and the particle counting detector stage 152 may be combined in a single stage. For example, if the taper in a focused laser beam is used appropriately, the particle counting detector could use the scattering emanating from the most tightly focused portion of the beam waist and MALS detection could use a broader portion of the beam waist of the focused 'cone' of light.

With optional DLS, scattered light from the same scattering volume is picked up by a single mode fiber and led to a very fast detector such as a photomultiplier or avalanche photodiode. The autocorrelation function is built from the incoming signal using either a hard-wired autocorrelator, or a software algorithm. The usual z-average diffusion coefficient and corresponding hydrodynamic diameters are extracted from the autocorrelation function. DLS signals are best when the coherence area is large and the scattering volume is low. Hence the highly focused beam in this stage serves for both particle counting and DLS. It is noted, however, that particle size must be small and flow velocity low for DLS on a flowing stream, otherwise a velocity component of the scatter adds into the scattered light autocorrelation function and spuriously increases the diffusion coefficient (and hence decreases the equivalent spherical hydrodynamic diameter) computed from an analysis of the autocorrelation function. Flow DLS often uses a stop-flow process to avoid the velocity component adding into the autocorrelation function, but it is not contemplated that this device will use stop flow, except possibly in the cases where only a small portion of the process stream flows through the device. Otherwise, small corrections for the velocity component may need to be made during the analysis. Alternatively, the scattering geometry can be configured so as to eliminate the velocity term $\exp(-\vec{q} \cdot \vec{v})$ in the autocorrelation function, by having $\vec{q} \perp \vec{v}$.

Light source 117, as depicted in FIG. 1A, provides incident UV light for the third detector stage 153, which uses UV absorption for measuring polymer concentration. Nucleic acids absorb around 260 nm and proteins around 280 nm (from tryptophan and tyrosine content), while polysaccharides generally have peak absorption <200 nm, but have shoulders above 200 nm. Detector stage 153 converts the loss of UV passing through the solution to the concentration of the biopolymer in the process flow liquid. Detector element 135 measures the intensity of transmitted light and compares it to the incident intensity from light source 117 for this measurement.

As shown in FIG. 1A, light source 119 corresponds to the fourth detector stage 154. Fourth detector stage 154 is configured to measure biopolymer conformational changes, substance entrapment, and other biopolymer characteristics. For example, the fluorescence spectrum of proteins changes when they unfold. A UV laser around 280 nm is used for excitation and two or more detection fibers for the fluorescence are used, each with a filter for different wavelength band pass ranges or cutoff ranges. Bandpass or cutoff filters 137, 139 have the function of separating the detected fluorescence into wavelength ranges. According to a non-limiting example, one filter may capture fluorescence emission in the wavelength interval of 300-320 nm, and the second may capture 320-350 nm. The ratio of the intensities from these two wavelength ranges then provide the information on the protein unfolding, since this ratio will change when a protein unfolds. Optical fibers 141, 143 collect fluorescence emission passing through the filters, which are transmitted to a light detector, such as a CCD or PD. The ratio of these signals changes with conformational changes. For example, unfolding of a protein is often a precursor step to aggregation and can be monitored by a change in ratio of two or more emission wavelengths, generally above 300 nm. Another use concerns molecules containing fluorophores whose spectra change when the polarity of their liquid environment changes. For example, a dye such as pyranine will increase in fluorescence intensity, and the emission spectrum will shift when it passes from an aqueous to an organic phase; e.g. from water into the interior of a micelle. Fluorescence ratios can monitor such a transition from one environment to another, such as when a drug is encapsulated in a polymeric micelle and subsequently released.

Depending on the absorption conditions, UV light source 119 of the fourth detector stage 154 and light source 117 of the third detector stage 153 can be unified so that a single UV source can be used simultaneously for absorption and fluorescence measurements.

As shown in FIG. 1A, detectors 140, 142 correspond to the fifth detector stage 155. Fifth detector stage 155 includes a pH detector 140 and a conductivity detector 142 configured to determine total ionic content which is directly related to ionic strength. pH and ionic strength have major effects on protein stability.

Device 100 may also include a flow viscometer that may be added by connecting at two points across the flow through the device; e.g. putting in a 'T' at the entry to the device and another at the exit, and using a sensitive differential pressure transducer to provide a signal proportional to the solution viscosity. Viscosity is a critical characteristic for high concentration protein therapeutic drugs, which are often manufactured and stored at high concentration, so as to reduce the volume doses needed for a patient. In some embodiments of the device the viscometer may be separate from the device and proceed or be subsequent to the device in the flow path and use a tubing diameter smaller than that of the device. This would occur when the diameter of the principal path is too large and the polymer solution of such low viscosity that the differential pressure drop across the device is too small to accurately measure.

Device 100 may also optionally include a process controller 175 configured to take the unified, continuous analysis of process characteristics measured by detectors 132, 134, 136, 138, 140, 142 to make control adjustments to keep the biopolymer within a desired specification or to drive it towards a desired specification. For example, pH, ionic strength, and stabilizers (excipients) such as polysorbate, glucose, and arginine can be used to inhibit protein aggregation. Hence, if aggregation is detected, process controller 175 can direct pumps 176, 177, 178 or other devices to change pH or ionic strength by adding agents such as acids/bases, salts, or stabilizers. Also, flow and stirring rates can be reduced if signs of aggregation occur. In the case where biopolymers are modified, the amounts and types of modifying agents and temperature can be modulated by the process controller to achieve desired final biopolymer characteristics.

As shown in FIG. 1A, process controller 175 may be communicatively coupled with detectors 132, 134, 136, 138, 140, 142 and/or any components coupled with such detectors. In at least some instances, process controller 175 may be communicatively coupled with a signal processing unit 185 configured to collect all the signals from detectors 132, 134, 136, 138, 140, 142, and/or any components coupled with such detectors, and provide unified, continuous computation of all the process characteristics. Device 100 may be configured to insert directly into the flow path of the biopolymer process or synthetic polymer process.

Figure 1B:
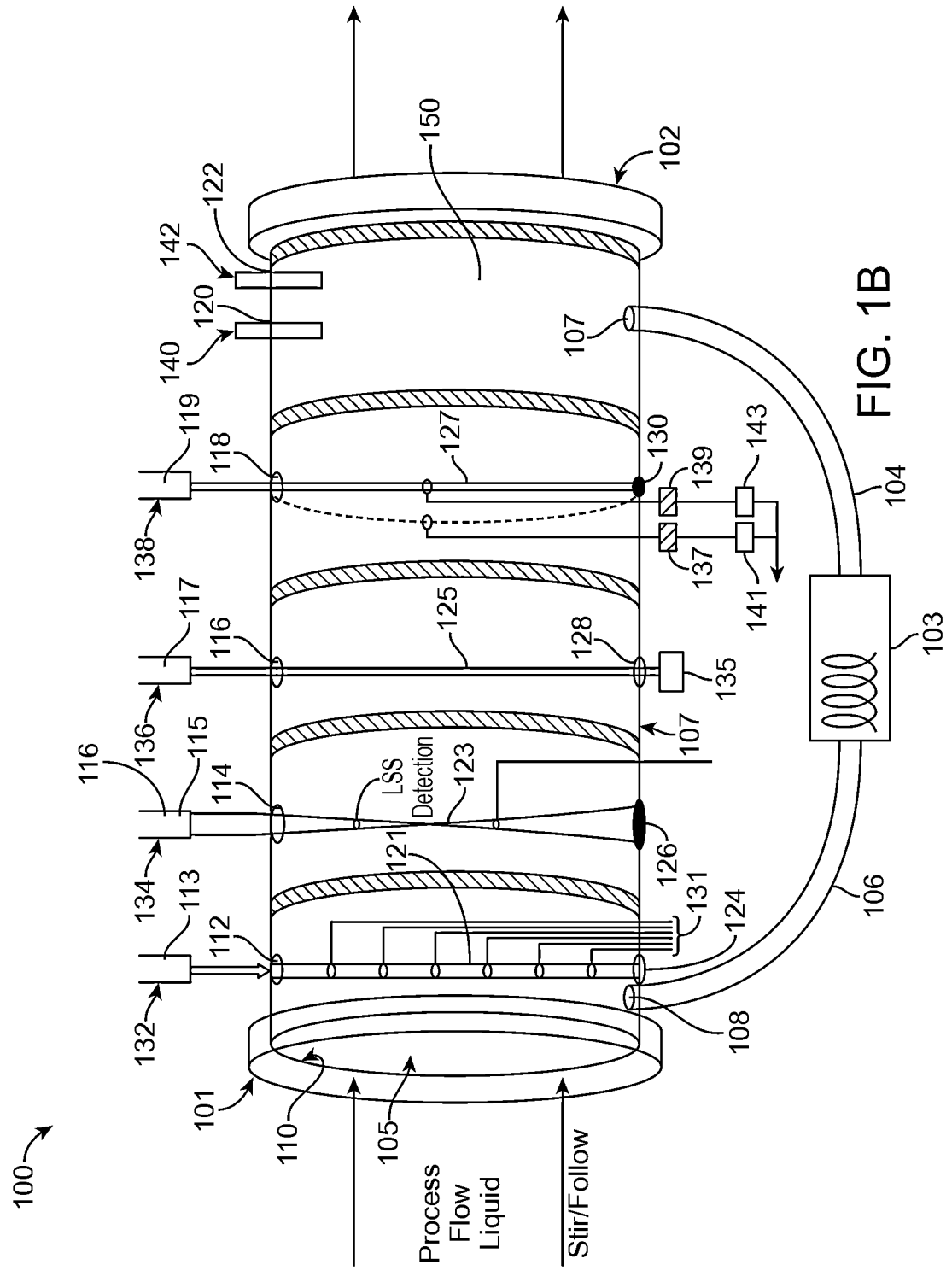
FIG. 1B illustrates the device of FIG. 1A including a differential viscometer, according to an example embodiment of the present disclosure.

FIG. 1B depicts device 100 further including an optional differential viscometer 103 coupled with body 150 via connection points 107, 108 and capillaries 104, 106.

Device 100, including body 150, may be inserted into a process flow path without disturbing the process flow. Accordingly, device 100 provides for characterization of the process flow, and chemical species therein, without the need for sampling or diversion of a portion of the process flow. Therefore, device 100 is suitable for use in laboratory, pilot plant, or full manufacturing scenarios in which no sampling or diversion of the process flow is desired. Device 100 may include a disposable insert whose inner diameter matches the inner diameter of the tubing of the flow path that feeds it such that no disturbance to the flow occurs.

In at least some instances, the first end 101 of body 150 is coupled with a first tube and the second end 102 coupled with a second tube to form a liquid flow path. The first tube may be configured to introduce a liquid into the body 150 and the second tube may be configured to provide an exit path of the liquid from the body 150. In such cases, the inner diameter of the body 150 and the inner diameter of the first and second tubes may be substantially the same such that there is no disturbance of a liquid flowing through the flow path.

Device 100 combines advanced light scattering and other techniques with statistical big data analyses to deliver continuous real-time information on particle concentration, particle size and molecular weight of biopharmaceuticals inline, during production. The light scattering portion of the system utilizes static light scattering and light scattering spike (LSS) counting algorithms to analyze proteins and aggregates as they flow through the process. Device 100 can be inserted throughout the process e.g. immediately post compounding, pre and post purification, before fill/finish, etc. Device 100 can also provide vial-by-vial acceptance or rejection of drug formulation. The development of a sterile disposable process interface with the sensor directly aligns with single use and disposable technology trends in biopharmaceutical manufacturing that reduce or eliminate costs associated with cleaning and sanitary considerations between batches and aligns with industry trends toward single use manufacturing setups. It also ensures that the sensors never foul, since the instrumentation is never in contact with the drug formulation.

Figure 2:
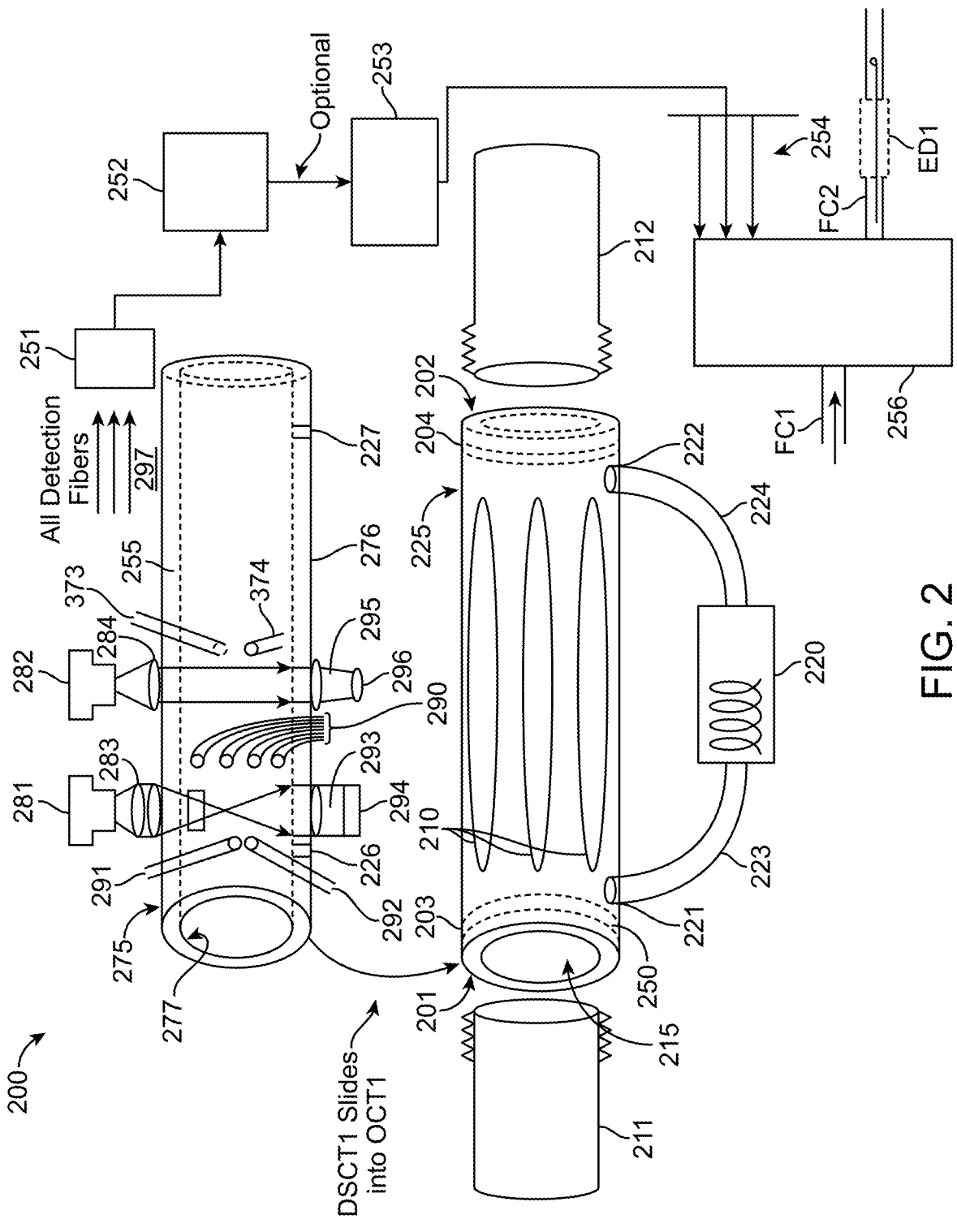
FIG. 2 illustrates a device comprising a flow tube configured to insert into an optical component tube, according to an example embodiment of the present disclosure.

FIG. 2 illustrates a device 200 comprising a flow tube 225 configured to insert or slide into an optical component tube 275, according to an example embodiment of the present disclosure. Device 200 can be used both in flow configuration and for immersion in a biopolymer processing vessel. When the device is used for immersion, the optical component tube 275 can be covered with a disposable prophylactic sheath (not shown) which prevents any contact between the optical component tube 275 and the biopolymer fluid in which it is immersed. The body 250 of the flow tube 225 can be made of a black or dark material, e.g., plastic, with transparent windows 210 arranged around its body 250. The body 250 is of unibody construction, in contrast to the modular stages of FIG. 1A and FIG. 1B. The flow tube 225 can also be made of a transparent material such as plastic or glass. In the case where government regulated therapeutic proteins or other biopharmaceuticals are involved, this material will be compatible with such regulations. In at least some instances the flow tube 225 may be disposable and/or made of a disposable material. The use of a disposable flow tube 225, such as that shown in FIG. 2, prevents protein fouling of internal optics which is a limitation of many current devices. The disposable flow tube 225 avoids this problem since it just gets disposed of after it is fouled, removing the need to clean the internal optics of the device 200. In at least some instances, the disposable flow tube 225, is capable of preserving or maintaining the sterility of the polymer containing liquid flowing through the flow tube and/or components in the flow path of the flow tube 225. Where UV based detectors are used, however, the material must either be UV transmissive (e.g. borosilicate glass cannot be used) or windows 210 must be UV transmissive windows. A black or dark body or interior coating reduces the amount of stray light present in light scattering detectors if a transparent material is used for the body 255 of the optical component tube 275.

As depicted in FIG. 2, the flow tube 225 may have windows 210 or alternatively, the flow tube 225 may be made of a transparent material. The flow tube 225 may include a first end 201 having thread 203 and a second end 202 having threads 204. The threads 203, 204 on the flow tube 225 may be used to connect the flow tube 225 to a first manufacturing point 211 and a second manufacturing point 212, respectively. Threads 203, 204 can be either internal or external threads. Threads 203, 204 may be on the flow tube 225 or may be on optical component tube 275 so long as threads 203, 204 are configured to releasably attach to first manufacturing point 211 and second manufacturing point 212. The flow tube 225 may optionally include a differential viscometer 220 coupled with the body 250 of the flow tube 225 via connection points 221, 222 and capillaries 223, 224. When the optional viscometer 220 is used, the optical component tube 275 will have viscometer ports 226, 227 that capillaries 223, 224 will pass through. In at least some instances, the optical component tube 275 may comprise modular ring detectors that slide over the flow tube 225. In some embodiments of the device the viscometer may be separate from the device and proceed or be subsequent to the device in the flow path and use a tubing diameter smaller than that of the device. This would occur when the diameter of the principal path is too large and the polymer solution of such low viscosity that the differential pressure drop across the device is too small to accurately measure.

As shown in FIG. 2, optical component tube 275 includes optical component tube body 255 and the light sources, associated beam steering and shaping optics and detector fibers, and direct detector mounts for any detection that is preferable without fiber optic coupling. The flow tube 225 is configured to insert or slide into the optical component tube 275 when the device is ready for use. If the flow tube 225 is made of transparent material there is no alignment required of the optical component tube 275 with respect to the flow tube 225. If the flow tube 225 comprises windows 210, as depicted in FIG. 2, the flow tube 225 may be quick-aligned with the optical component tube 275, when the flow tube 225 is slid or inserted into the optical component tube 275. Long, narrow windows 210 make both rotational and longitudinal alignment of optical component tube 275 and the flow tube 225 easy. The optical component tube 275 may also include detents, such as small depressable ball bearings, or other alignment guides such as a groove that can be used for "clicking" the flow tube 225 into the optical component tube 275, ensuring proper alignment.

Device 200 may also include light sources 281, 282 mounted on the exterior 276 of the optical component tube 275. In at least some instances, light sources 281, 282 may be either lasers or LEDs. The first light source 281 is shown in FIG. 2 with a lens pair 281. Lens pair 281 may include, for example, a collimation lens (especially important if an uncollimated light source is used) followed by a focusing lens. The focus of the lens can be anywhere within the flow tube 225, and is shown for convenience near the center. This beam can be used for either total intensity scattering, including MALS, or particle characterization, or DLS, or any two of these, or all three. Device 200 may also include multiple scattering detector optical fibers 290 used for detection of scattered light at various angles (MALS). Also shown is a single mode fiber 291 for DLS, and a separate particle characterization fiber 292 used for analyzing light scattering spikes from particulates. The optical component tube 275 may further include a first exit window 293 for the first light source 281 beam, followed by a beam dump 294. In the case of a dark or blackened optical component tube 275 it may be possible to eliminate the first exit window 293 and beam dump 294 and have the light simply impinge upon the non-reflecting internal, dark surface 277 of the optical component tube 275.

As depicted in FIG. 2, device 200 may also include a second light source 282 with a collimated, not focused beam passing through the tube 275, the collimation being produced by lens 284. This can be used for intensity loss detection, for example to determine the concentration of a biopolymer or auxiliary substance (e.g. a fluorophore containing molecule), and can also be used for the excitation source for producing fluorescence. A second exit window 295 is allows the surviving light to impinge on the intensity loss fiber 296.

Device 200 may further include a detector 251 configured to receive and detect all light, whether scattered, intensity loss, or fluorescence. The detector 251 may be configured to receive the light by being coupled with fiber optics configured to transport the light from any of the fibers coupled with optical component tube 275 to the detector 251. For example, detection fiber bundle 297 may be coupled with detector 251 and each of the fibers coupled with optical component tube 275. Detector 251 can comprise one of more CCDs (charge coupled device), photodiodes, photomultiplier tubes, or any combination of these and other photodetectors. Detector 251 may be communicatively coupled with a computing and analysis device 252. The signals from detector 251 may be communicated to the computing and analysis device 252. The computing and analysis device 252 may be configured to determine all the measured characteristics of the biopolymers passing through the device, such as, but not limited to, $M_w$, density of particles, radius of gyration Rg, concentration of biopolymer, and state of conformational changes.

Optionally, device 200 may include a manufacturing controller 253 communicatively coupled with the computing and analysis device 252. The manufacturing controller 253 may be configured to receive the analyzed data from computing and analysis device 252 and actuate various process control variable controllers 254 configured to act on one or more manufacturing vessels 256. The process control variable controllers 254 may be configured to control process variables such as flow rate, temperature, agitation type and intensity, addition of components such as acids, bases, stabilizers, and other agents. Device 200, comprising optical component tube 275 and flow tube 225, may thus be coupled with one or more manufacturing vessels 256. Additional devices may also be coupled between device 200 and the one or more manufacturing vessels 256, including, for example, a filtration device, or a filling device.

Figures 3, 4, 5:
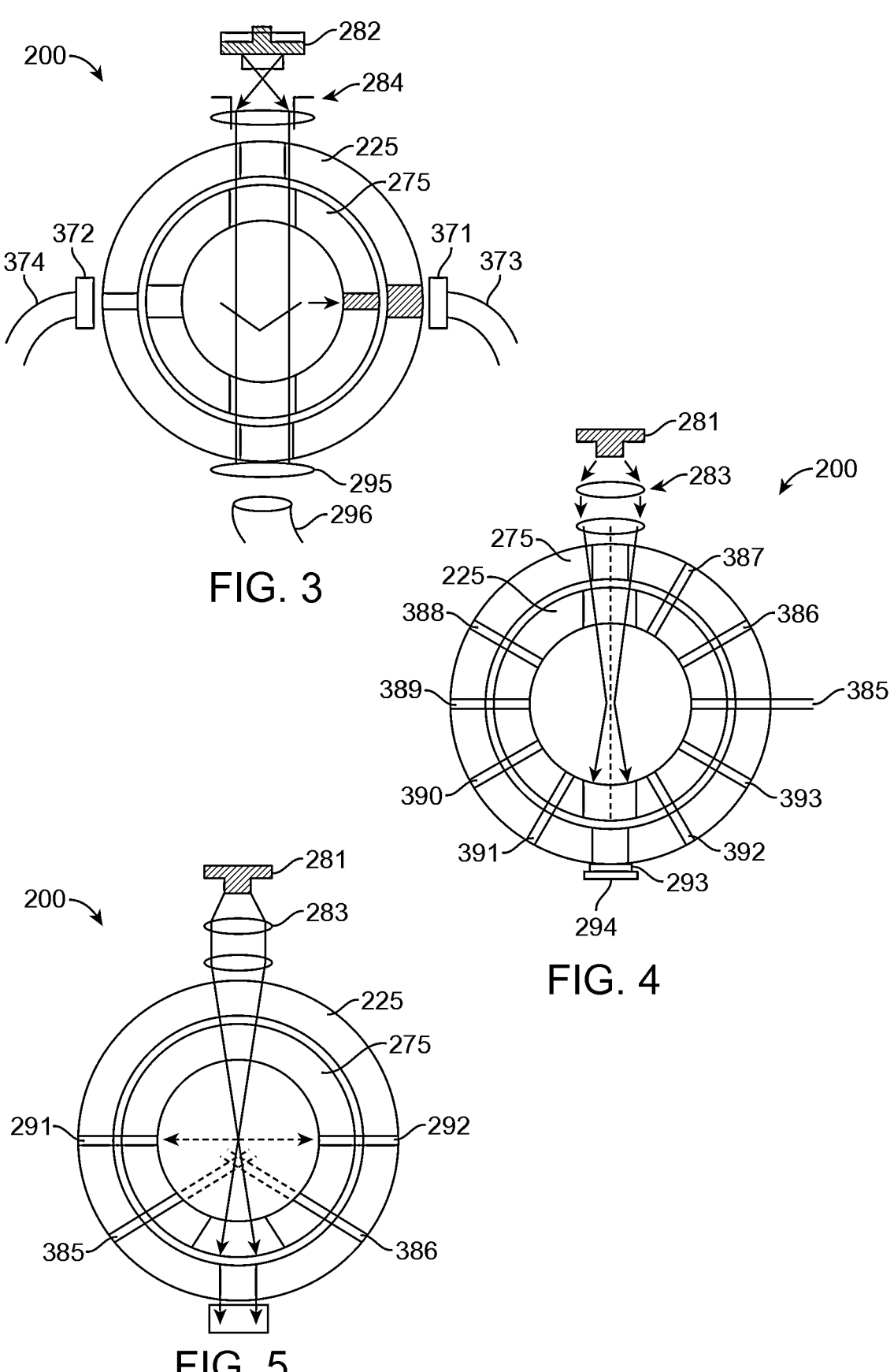
FIG. 3 illustrates as cross-section of the device of FIG. 2, showing a second light source whose light is collimated by a lens and passes through the flow tube and the optical component containing tube, according to an example embodiment of the present disclosure.
FIG. 4 illustrates a cross-section of the device of FIG. 2, showing a first light source being collimated and then gradually focused by a lens assembly, according to an example embodiment of the present disclosure.
FIG. 5 illustrates a cross-section of the device of FIG. 2, with a lens assembly providing very sharp focusing of the beam of a first light source within the flow tube, according to an example embodiment of the present disclosure.

FIGS. 3-5 illustrate cross-sections of the device 200 depicted in FIG. 2, showing additional aspects of incident light delivery and detection. Specifically, FIG. 3 illustrates a second light source 282 whose light is collimated by a lens assembly 284 (which may contain one or more lens or optical components such as apertures or spatial filters) and passes through the flow tube 225 and the optical component containing tube 275. The second light source 282 may be an LED or laser. The polymer containing liquid is within the flow tube 225. The second exit window 295, which can also be a lens, directs the throughput light onto intensity loss fiber 296, whose signal is then analyzed for intensity loss and converted into a concentration or other characteristic of the polymer containing liquid. Fluorescence emission from the polymer containing liquid passes through fluorescence filters 371, 372, each one transmitting a characteristic wavelength range; e.g., fluorescence filter 371 transmits 300-320 nm and fluorescence filter 372 transmits 340-360 nm. Behind fluorescence filters 371, 372, fluorescence detection fibers 373, 374 convey the filtered light from fluorescence filters 371, 372 to photodetectors. Alternatively, photodetectors can be mounted directly behind fluorescence filters 372, 372.

FIG. 4 illustrates a cross-section of device 200 with the first light source 281 being collimated and then gradually focused by lens assembly 283 (which may contain one or more lens or optical components such as apertures or spatial filters). Scattered light detection fibers 385, 386, 387, 388, 389, 390, 391, 392, 393 are arranged at various angles around the device to relay MALS signals to the photodetector(s). Alternatively, photodetectors can be mounted at the position of the fibers.

FIG. 5 illustrates a cross-section of device 200 with lens assembly 283 providing very sharp focusing of the beam of the first light source 281 within the flow tube 225. Scattered light emanating from the tight focus is collected by single mode fiber 291 and led to a fast photodetector (e.g., photoavalanche diode with 1 nanosecond response time) whose signal is passed to an autocorrelator to compute the DLS autocorrelation function. Scattered light emanating from the tight focus is also collected by particle characterizing fiber 292, which need not be a single mode fiber, and led to a photodetector with a response time of at least 10 milliseconds, from which particle characterizing computations are made. The wider portion of the beam is used for MALS, since the intensity fluctuations in the tight focus may be too large for total intensity scattering in a smooth manner. Such detection can be achieved by orienting the scattering detection fibers 385, 386 (and as many as desired) off center, as shown in FIG. 5.

In at least some instances, the optical component tube 275 of device 200 is a "unibody" in which all optical assemblies and the viscosity segment reside on a single optical component tube 275.

Device 200, including body 250 and flow tube 225, may be inserted into a process flow path without disturbing the process flow. Accordingly, device 200 provides for characterization of the process flow, and chemical species therein, without the need for sampling or diversion of a portion of the process flow. Therefore, device 200 is suitable for use in laboratory, pilot plant, or full manufacturing scenarios in which no sampling or diversion of the process flow is desired. For example, in the case of biopolymer production for pharmaceutical purposes, such as vaccines, proteins and monoclonal antibodies, it is often not permitted to sample a production stream since that can lead to contamination at the sampling site. Body 250 and/or flow tube 225 may have an inner diameter that matches the inner diameter of the tubing of the flow path that feeds it such that no disturbance to the flow occurs.

In at least some instances, the first end 201 of flow tube 225 is coupled with a first tube and the second end 202 coupled with a second tube to form a liquid flow path. The first tube may be configured to introduce a liquid into flow tube 225 and the second tube may be configured to provide an exit path of the liquid from flow tube 225. In such cases, the inner diameter of flow tube 225 and the inner diameter of the first and second tubes may be substantially the same such that there is no disturbance of a liquid flowing through the flow path.

Device 200 combines advanced light scattering and other techniques with statistical big data analyses to deliver continuous real-time information on particle concentration, particle size and molecular weight of biopharmaceuticals inline, during production. The light scattering portion of the system utilizes static light scattering and light scattering spike (LSS) counting algorithms to analyze proteins and aggregates as they flow through the process. Device 200 can be inserted throughout the process e.g. immediately post compounding, pre and post purification, before fill/finish, etc. Device 200 can also provide vial-by-vial acceptance or rejection of drug formulation. The development of a sterile disposable process interface with the sensor directly aligns with single use and disposable technology trends in biopharmaceutical manufacturing that reduce or eliminate costs associated with cleaning and sanitary considerations between batches and aligns with industry trends toward single use manufacturing setups. It also ensures that the sensors never foul, since the instrumentation is never in contact with the drug formulation.

Figure 6:
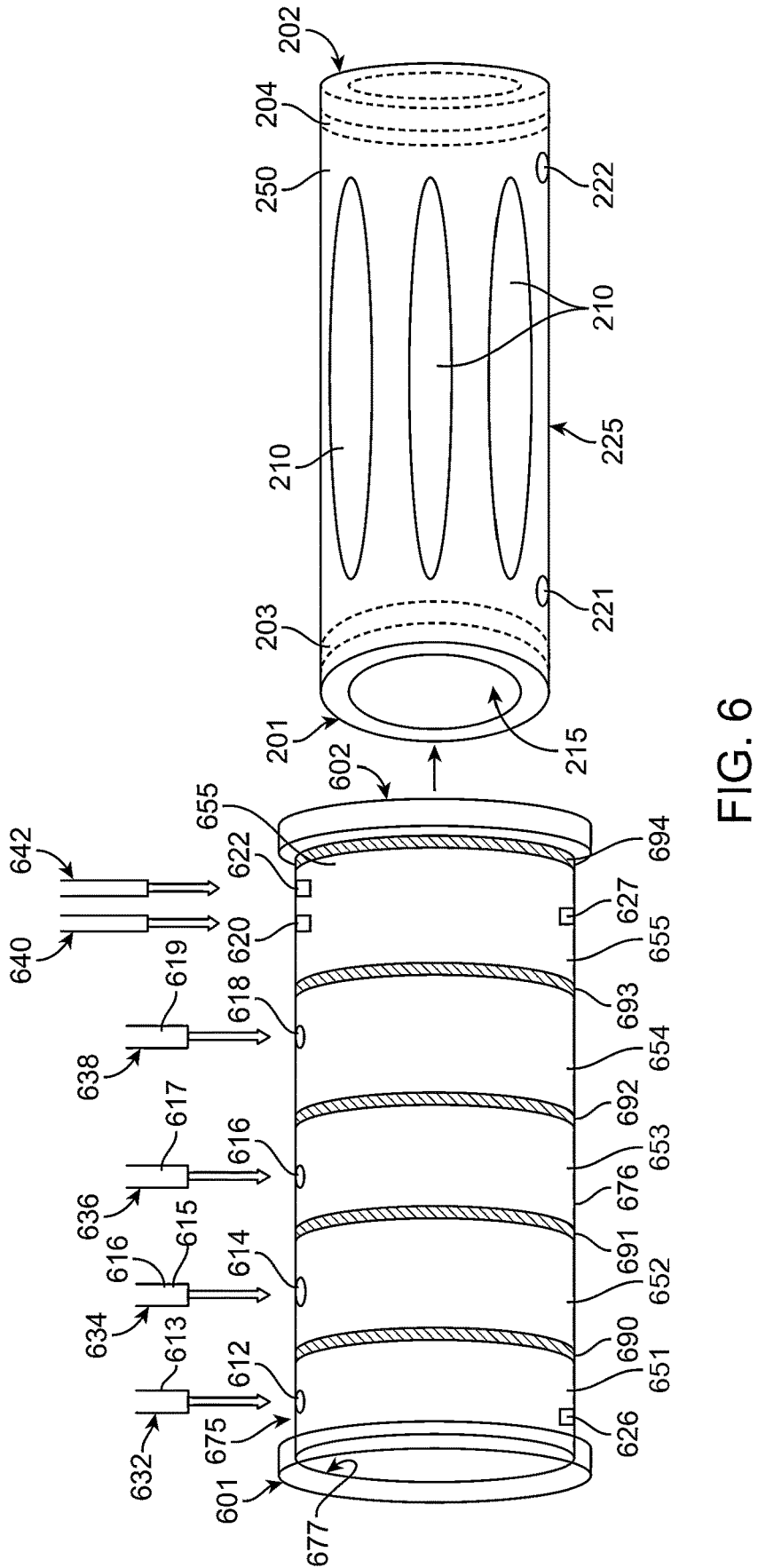
FIG. 6 illustrates an optical component tube comprising modular detector rings configured to receive the flow tube shown in FIGS. 2-5, according to an example embodiment of the present disclosure.

FIG. 6 illustrates an optical component tube 675 comprising modular detector rings 651, 652, 653, 654, 655 configured to receive the flow tube 225 shown in FIGS. 2-5. In particular, modular detector rings 651, 652, 653, 654, 655 are configured to slide over flow tube 225 and are attached to one another by connection means 690, 691, 692, 693, 694. As described above with respect to FIG. 1A, connection means 690, 691, 692, 693, 694 may be any connections means that allow the modular detector rings 651, 652, 653, 654, 655 to interlock or attach sufficient to provide an integrated fluid flow path 215. In at least some instances, connections means 690, 691, 692, 693, 694 comprise a releasable connection means configured to releasably attach modular detector rings 651, 652, 653, 654, 655. In at least some instances the fluid flow path 215 defined by attached modular detector rings 651, 652, 653, 654, 655 is an uninterrupted or unperturbed fluid flow path 215. The connection means 690, 691, 692, 693, 694 may include, but are not limited to, means for slipping, bolting, snapping, or interlocking the modular detector rings 651, 652, 653, 654, 655 together. The modular detector rings 651, 652, 653, 654, 655 are separable so that any number or type of modular detector rings may be selected according to the application. In this way, optical component tube 675 is customizable to the application by selection of one or more modular detector rings, such as modular detector rings 651, 652, 653, 654, 655.

As depicted in FIG. 6, optical component tube 675 includes apertures 612, 614, 616, 618, 620, and 622 configured to receive a corresponding one of detectors 632, 634, 636, 638, 640, and 642. Detectors 632, 634, 636, 638 comprise light sources 613, 615, 617, 619, may be the substantially the same as detectors 132, 134, 136, 138 described with respect to FIG. 1A. As depicted in FIG. 6, the optical component tube 675 further includes pH detector 640 and a conductivity detector 642 configured to determine total ionic content which is directly related to ionic strength, as described above with respect to FIG. 1A.

In at least some instances, the light sources for the optical component tubes 275, 675 may also be located remotely and delivered to the optical component tubes 275, 675 via fiber optics. This could reduce the dimensions and weight of the optical component tube 275, 675. The lasers, LEDs, and/or other light sources may sit in their own enclosure as close to or as far from the optical component tube 275, 675 as desired. In such cases, the lens assemblies remain on the optical component tube 275, 675.

Figure 7:
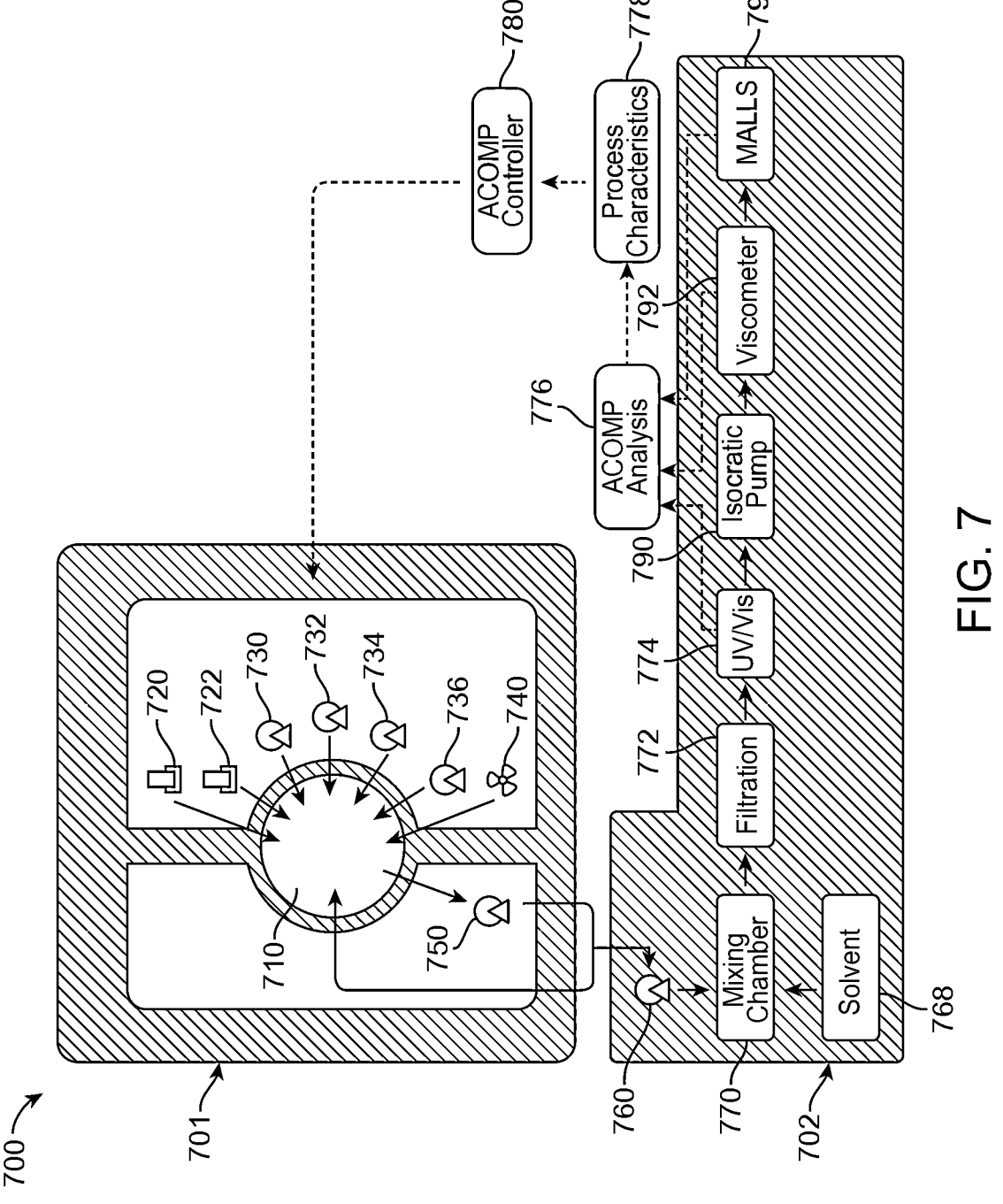
FIG. 7 is an illustration depicting an ACOMP unit, according to an example embodiment of the present disclosure, according to an example embodiment of the present disclosure.

According to at least one aspect of the present disclosure, one or more of the presently disclosed devices may be configured to be used as the detection portion of an ACOMP system, such as the ACOMP system 700 depicted in FIG. 7. In such cases, the ACOMP system 700 will provide a continuous, dilute stream to the flow-through device and make at least some of the measurements ACOMP normally provides, particularly $M_w$, n, polymer concentration, and viscosity.

Automatic Continuous Online Monitoring of Polymerization reactions (ACOMP) allows control of reaction kinetics, reduced viscosity, and molecular weight, using initiator and monomer feeds into the reactor, as well as other agents such as chain transfer agents, cross-linking and branching agents, inhibitors, and quenchers, in addition to temperature. In achieving this type of control, variables measured by ACOMP such as polymer and monomer concentration, $M_w$, reduced viscosity and $M_{w,inst}$ and instantaneous reduced viscosity are used and manipulated by the above listed control agents to follow a desired reaction trajectory.

FIG. 7 illustrates an exemplary ACOMP system 700, according to an example embodiment of the present disclosure, where it is understood that the detectors shown here are embodied according to the currently disclosed device, such as devices 100 and 200 shown in FIGS. 1 and 2. The ACOMP system 700 includes an ACOMP reactor control interface 701 and an ACOMP analysis control interface 702. In at least some instances, the ACOMP reactor control interface 701 and the ACOMP analysis control interface 702 are controlled by a Programmable Logic Controller (PLC) control system (not shown) which is coupled to a computing device (not shown). The computing device can be a desktop or laptop computer, a smartphone, a tablet, or any other similar device. The computing device can allow for visualization and control of process control variables and components of the ACOMP system 700.

The ACOMP reactor control interface 701 can control various components of the ACOMP system 700. One component is a reactor 710. The reactor 710 may be any reactor capable of containing a liquid, such as a polymer solution, or a solution undergoing a reaction, including but not limited to polymerization. The ACOMP system 700 may further include a mixer 740 that may be located outside of the reactor 710 and be capable of mixing liquids contained in reactor 710. ACOMP system 700 may further include flow controllers 720, 722 capable of delivering gases into reactor 710. As depicted in FIG. 7, ACOMP unit 700 may further include pumps 730, 732, 734 capable of delivering solutions or liquids to reactor 710. The reactor 710 and contents contained therein can also be subjected to heating or cooling from temperature controller 736. Reactor 710 may also be coupled with a recycle pump 750 coupled with a bottom portion of reactor 710 via a drain port (not shown) and a ball valve (not shown). Reactor 710 contents can be continuously extracted through the recycle pump 750 and recycled back into the top of the reactor 710. An extraction pump 760 connects the ACOMP system interface 702 to the reactor control interface 701 via the recycle pump 750.

As depicted in FIG. 7, the extracted reactor contents may be combined with a flow of quenching solvent from solvent source 768. Once the reactor contents are combined with the quenching solvent, the combination may be passed by inert propylene tubing to a dynamic mixing chamber 770. The mixing chamber 770 can be used to actively stir and combine the two continuous streams of reactor contents and solvent into one homogeneous mixture. After the homogenous solution leaves the mixing chamber, it may be passed through a filtration system 772 to remove any particulate or gel matter that may have been removed from the reaction 710 with the reactor contents. The filtered homogeneous solution can then be flowed through one or more inline analytical detectors such as a UV/Visible absorption spectrometer 774. A fraction of the polymer containing liquid stream may be diverted by pump 790 to one or more viscometers 792 and a Multi Angle Laser Light Scattering (MALLS) detector 794. The ACOMP system 700 includes an on-board analysis package 776 capable of analyzing data obtained by detectors 774, 792, 794. The analysis package 776 may in some instances respond to manual operation triggers through interface with Automation and Control software. These triggers instruct the analysis software to perform key analysis algorithms appropriate to each step or phase in the polymer reaction process. Process characteristics 778 may be determined based on the analysis carried out by the analysis package 776.

The ACOMP system 700 may further include a process controller 780 coupled with the ACOMP reactor control interface 701 and the ACOMP analysis control interface 702 to provide a means by which the user can interact with the ACOMP reactor control interface 701 to perform the operations that may control or influence polymer reactions in reactor 710.

In the case where one or more devices of the present disclosure are used as all or part of the detection portion of ACOMP, means for active manual control, active computer assisted manual control, and fully automatic active control have recently been published. Terry McAfee, Natalie Leonardi, Rick Montgomery, Julia Siqueira, Thomas Zekoski, Michael F. Drenski, Wayne F. Reed, "Automatic control of polymer molecular weight during synthesis", Macromolecules, 49 (19), 7170-7183, 2016, DOI: 10.1021/acs.macromol.6b01522

Figure 8:
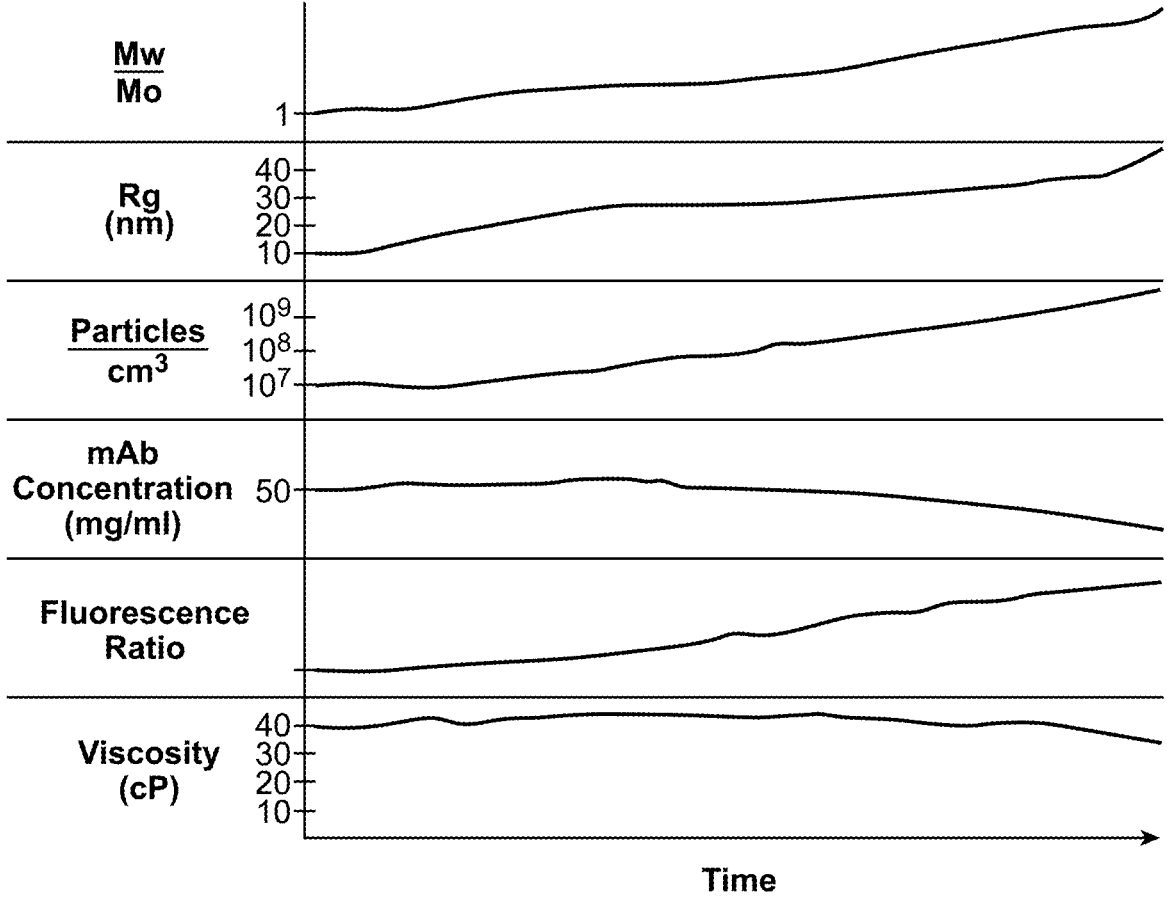
FIG. 8 illustrates data that may be collected using the devices shown in FIGS. 1-7, according to an example embodiment of the present disclosure.

FIG. 8 illustrates data that may be collected using the devices shown in FIGS. 1-7, according to an example embodiment of the present disclosure. FIG. 8 shows conceptual (not actual) data that may be provided by the presently disclosed devices. It shows the trends in the various signals from the detectors that would be expected for a protein that is aggregating during processing steps, such as filtration. The MALS detector yields $M_w/M_o$ and $R_g$. $M_w/M_o$ increases, showing the increasing aggregation, while the increase in $R_g$ early on indicates that a small population of large aggregate is formed. If a large population of small aggregates (e.g. tetramers) formed then $R_g$ would remain essentially flat. The particle concentration n, is determined from LSS, via LSS recognition and counting software to be written. The mAb concentration is roughly constant but then begins to decrease towards the end as the aggregate population increases significantly. The fluorescence ratio increases as more proteins unfold. The solution viscosity decreases as aggregates build up, because in this case the aggregates are presumed to be dense structures with low intrinsic viscosity.

Figure 9:
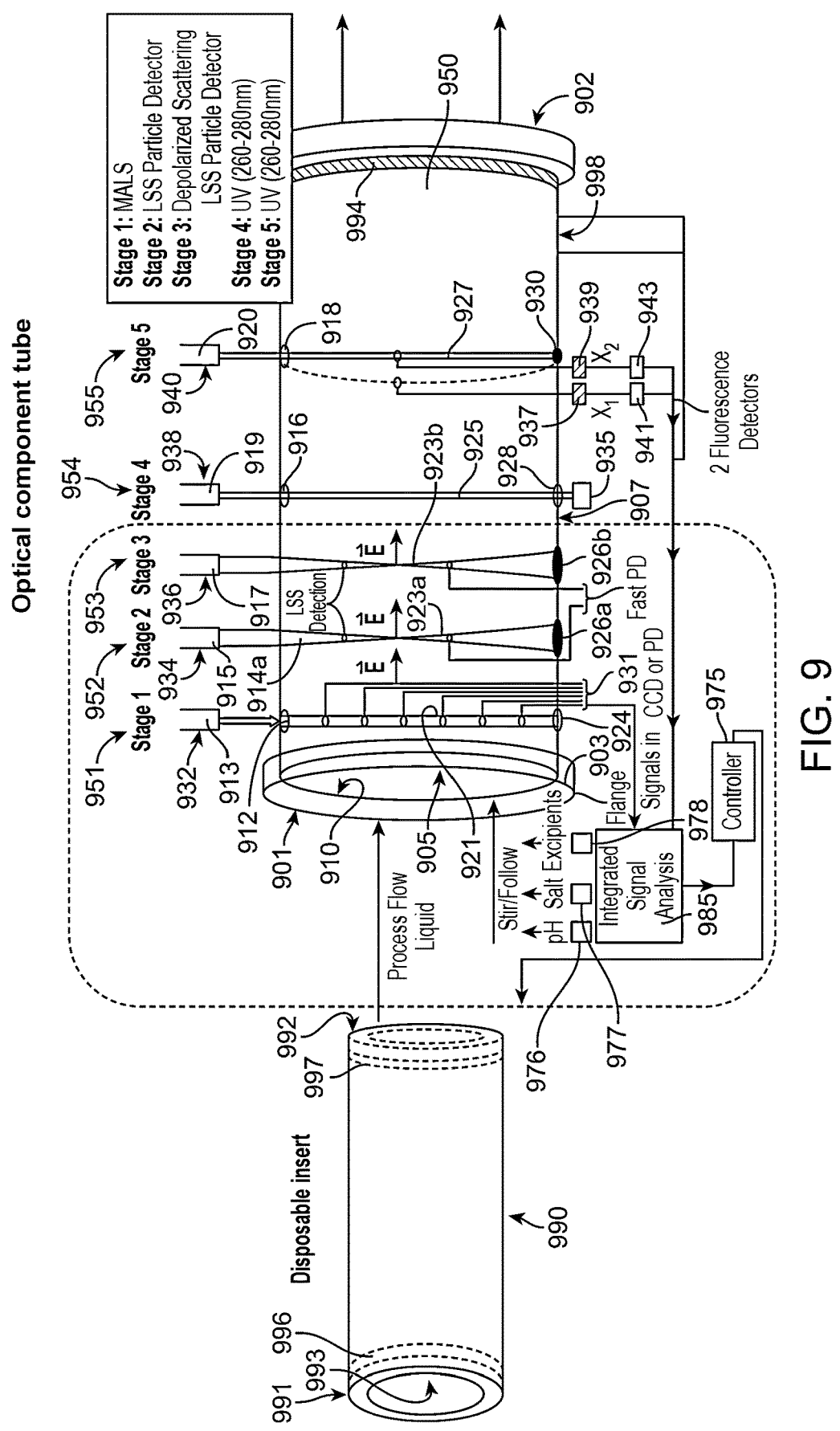
FIG. 9 illustrates a device comprising a flow tube configured to insert into an optical component tube having a fixed-length unibody construction, according to an example embodiment of the present disclosure.

According to at least one aspect of the present disclosure, a device 900 is provided that includes optical component tube 998 having a body 950, as shown in FIG. 9. As depicted in FIG. 9, body 950 has a unibody construction. For example, FIG. 9 illustrates an optical component tube 998 whose body 950 has a unibody construction providing a fixed-length chassis on which one or more detectors may be mounted. For example, body 950 may be a single-length tube into which one or more detectors may be added, as compared to the modular design comprising separate modules described above with respect to FIGS. 1A and 1B. As depicted in FIG. 9, the device 900 includes an optical component tube 998 having a unibody construction and fixed-length into which is inserted a flow tube 990 that defines a fluid flow path 905 capable of receiving a process flow liquid such that the process flow liquid may flow through an interior portion 993 of flow tube 990 received by an interior portion 910 of body 950 of optical component tube 998. The insertable flow tube 990 is either transparent along the entirety of its cylindrical body or has transparent windows (not shown), similar to windows 210 described above with respect to FIG. 2. In at least some instances, the fluid flow path 905 may be an inner bore of body 950. The body 950 also has a first end 901 and a second end 902. The first end 901 may be configured to receive a process flow liquid and the second end 902 may be configured to permit the exit of the process flow liquid from the interior portion 993 of flow tube 990. In some instances, body 950 may comprise transparent windows (not shown) arranged around the body 950, similar to windows 210 described above with respect to FIG. 2. In other cases, body 950 may not comprise transparent windows. According to one aspect of the present disclosure, the unibody construction of optical component tube 998, as compared to the modular design described with respect to FIGS. 1A and 1B above, simplifies uniform manufacture and performance of device 900 and any unused portion or length of optical component tube 998 or body 950 due to using less than all detectors causes no harm to the performance of device 900.

Device 900 further includes one or more apertures in body 950, each aperture configured to receive a detector capable of monitoring one or more parameters occurring in the process flow liquid. As depicted in FIG. 9, body 950 of device 900 includes apertures 912, 914*a*, 914*b*, 916, and 918 configured to receive a corresponding one of detectors 932, 934, 936, 938, and 940. Detectors 932, 934, 936, 938, and 940 comprise light sources 913, 915, 917, and 919, respectively. Such light sources may be lasers or LEDs (light emitting diodes). Light sources 913, 915, 917, 919 are configured to produce a light or laser beam comprising detection paths 921, 923*a*, 923*b*, 925, 927, respectively, through the fluid flow path 905 such that the characteristics of process flow liquid moving through detection paths 921, 923*a*, 923*b*, 925, 927 may be determined by a respective one of detectors 932, 934, 936, 938, and 940. As shown in FIG. 9, device 900 includes MALS light source 913, LSS particle detector light source 915, depolarized scattering LSS particle detector light source 917, UV light source 919, and UV light source 920. In at least some instances, body 950 may also include one or more of apertures diametrically opposed to a corresponding one of the apertures in order to provide an exit point for one or more detectors or one or more beams emanating from the light sources, or to provide access to additional components coupled with the detectors, or to provide an additional pathway by which a detector may be communicatively coupled with a device or component exterior to body 950, such as a controller or signal processor, or to provide a termination device for the light source, such as a beam dump. In some instances, one or more of the apertures may have a beam stop, such as beam stops 926*a*, 926*b*, 930, inserted in an aperture.

As depicted in FIG. 9, body 950 also includes apertures 924 and 928 diametrically opposed to a corresponding one of apertures 912 and 916, allowing detector 932 and 938, and/or beams from corresponding light sources 913 and 919, to pass through the fluid flow path 905 and exit the body 950 on the opposite side or to provide detection paths 921, 925 through the fluid flow path 905 that is in communication with detector elements 931, 935 on the exterior 907 of body 950. As depicted in FIG. 9, detection element 931 is a set of detection fibers configured to detect the scattered light for the corresponding light scattering detector 932. Body 950 may also include beam stops, such as beam stops 926*a*, 926*b*, 930, diametrically opposed to one or more apertures, such as corresponding apertures 914*a*, 914*b*, 918. In some instances, beam stops 926*a*, 926*b*, 930 may be replaced by exit apertures.

One or more of the detectors corresponds to a detector stage configured to detect, measure, or monitor one or more process characteristics or conditions. As depicted in FIG. 9, device 900 includes five detector stages 951, 952, 953, 954, 955. Detectors 932, 934, 936, 938, and 940 correspond to detector stages 951, 952, 953, 954, and 955, respectively. As depicted in FIG. 9, detector stage 951 corresponds to a MALS detector stage, detector stage 952 corresponds to a LSS Particle Detector stage, detector stage 953 corresponds to a Depolarized Scattering LSS Particle Detector stage, detector stage 954 corresponds to a UV (260 nm-280 nm) detector stage, and detector stage 955 corresponds to a UV (260 nm-280 nm) detector stage. The presently disclosed devices may include any number of stages. The order of stages is not important. One of skill in the art will appreciate that any number, type, or order of detector stages may be included in device 900 without departing from the spirit and scope of the present disclosure. As depicted in FIG. 9, each of detector stages 951, 952, 953, 954, 955 are incorporated into the unibody construction of body 950. Accordingly, body 950 does not employ nor require the connection means described in FIG. 1A above. Body 950 may also include one or more flanges 903.

As shown in FIG. 9, detector stage 5 may include a 260 nm-280 nm UV laser for excitation and two or more detection fibers for the fluorescence may be used, each with a filter for different wavelength band pass ranges or cutoff ranges. Bandpass or cutoff filters 937, 939 have the function of separating the detected fluorescence into wavelength ranges. According to a non-limiting example, one filter may capture fluorescence emission in the wavelength interval of 300-320 nm, and the second may capture 320-350 nm. The ratio of the intensities from these two wavelength ranges then provide the information on the protein unfolding, since this ratio will change when a protein unfolds. Optical fibers 941, 943 collect fluorescence emission passing through the filters, which are transmitted to a light detector, such as a CCD or PD.

Device 900 may also optionally include a process controller 975 configured to take the unified, continuous analysis of process characteristics measured by detectors 932, 934, 936, 938, and 940 to make control adjustments to keep the biopolymer within a desired specification or to drive it towards a desired specification. For example, pH, ionic strength, and stabilizers (excipients) such as polysorbate, glucose, and arginine can be used to inhibit protein aggregation. Hence, if aggregation is detected, process controller 975 can direct pumps 976, 977, 978 or other devices to change pH or ionic strength by adding agents such as acids/bases, salts, or stabilizers. Also, flow and stirring rates can be reduced if signs of aggregation occur. In the case where biopolymers are modified, the amounts and types of modifying agents and temperature can be modulated by the process controller to achieve desired final biopolymer characteristics.

As shown in FIG. 9, process controller 975 may be communicatively coupled with detectors 932, 934, 936, 938, 940 and/or any components coupled with such detectors. In at least some instances, process controller 975 may be communicatively coupled with a signal processing unit 985 configured to collect all the signals from detectors 932, 934, 936, 938, 940 and/or any components coupled with such detectors, and provide unified, continuous computation of all the process characteristics. Device 900 may be configured to insert directly into the flow path of the biopolymer process or synthetic polymer process.

As depicted in FIG. 9, device 900 may further include a flow tube 990 configured to insert or slide into body 950 of optical component tube 998. In at least some instances the flow tube 990, which may also be referred to as a removable insert, may be disposable and/or made of a disposable material. It may also be removed after use, cleaned, and re-inserted. The use of a disposable flow tube 990, such as that shown in FIG. 9, prevents protein fouling of internal optics which is a limitation of many current devices. The disposable flow tube, or disposable insert, 990 avoids this problem since it just gets disposed of after it is fouled, removing the need to clean the internal optics of the device 900. In at least some instances, the disposable flow tube 990, is capable of preserving or maintaining the sterility of the polymer containing liquid flowing through the flow tube and/or components in the flow path of the flow tube 990. Where UV based detectors are used, however, the material must be UV transmissive (e.g. borosilicate glass cannot be used). A black or dark body or interior coating reduces the amount of stray light present in light scattering detectors if a transparent material is used for the body 950 of the optical component tube 998.

The flow tube 990 may have windows, such as windows 210 described above with respect to FIG. 2, or alternatively, the flow tube 990 may be made of a transparent material. The flow tube 990 is configured to be releasably attached to the body 950 of optical component tube 998 in order to provide an integrated fluid flow path 905 or a uninterrupted or unperturbed fluid flow path 905 through an interior portion 993 of flow tube 990. The flow tube 990 may include a first end 991 having thread 996 and a second end 992 having threads 997. The threads 996, 997 on the flow tube 990 may be used to connect or otherwise secure the flow tube 990 to the body 950 or within the flow path 905 of device 900. Threads 996, 997 can be either internal or external threads. Opposing threads configured to receive threads 996, 997 may be on the body 950 of optical component tube 998. Threads 996, 997 may be on the flow tube 990 or may be on optical component tube 998 so long as threads 996, 997 are configured to releasably attach the flow tube 990 to the body 950 of optical component tube 998. In at least some instances, threads 996, 997 are configured to releasably attach to a first manufacturing point and a second manufacturing point, such as first manufacturing point 211 and second manufacturing point 212 described above with respect to FIG. 2. Body 950 of optical component tube 998 may also include detents, such as small depressable ball bearings, or other alignment guides such as a groove that can be used for "clicking" the flow tube 990 into the optical component tube 998, ensuring proper alignment. One of skill in the art will appreciate that device 900, including flow tube 990, may also include the features described above with respect to FIG. 2. Device 900, including body 950, may be inserted into a process flow path without disturbing the process flow. Accordingly, device 900 provides for characterization of the process flow, and chemical species therein, without the need for sampling or diversion of a portion of the process flow. Therefore, device 900 is suitable for use in laboratory, pilot plant, or full manufacturing scenarios in which no sampling or diversion of the process flow is desired. Device 900 may include a disposable insert whose inner diameter matches the inner diameter of the tubing of the flow path that feeds it such that no disturbance to the flow occurs.

In at least some instances, the first end 991 of flow tube 990 is coupled with a first tube and the second end 992 coupled with a second tube to form a liquid flow path. The first tube may be configured to introduce a liquid into the flow tube 990 and the second tube may be configured to provide an exit path of the liquid from the flow tube 990. In such cases, the inner diameter of the flow tube 990 and the inner diameter of the first and second tubes may be substantially the same such that there is no disturbance of a liquid flowing through the flow path.

Device 900 combines advanced light scattering and other techniques with statistical big data analyses to deliver continuous real-time information on particle concentration, particle size and molecular weight of biopharmaceuticals inline, during production. The light scattering portion of the system utilizes static light scattering and light scattering spike (LSS) counting algorithms to analyze proteins and aggregates as they flow through the process. Device 900 can be inserted throughout the process e.g. immediately post compounding, pre and post purification, before fill/finish, etc. Device 900 can also provide vial-by-vial acceptance or rejection of drug formulation. The development of a sterile disposable process interface, the insertable and removable flow tube with the sensor directly aligns with single use and disposable technology trends in biopharmaceutical manufacturing that reduce or eliminate costs associated with cleaning and sanitary considerations between batches and aligns with industry trends toward single use manufacturing setups. It also ensures that the sensors never foul, since the instrumentation is never in contact with the drug formulation.

The presently disclosed devices can take on a variety of dimensions, according to the context in which it is implemented. For example, for device 200, the inner diameter of the flow paths can range from 0.01 cm up to 250 cm or more. Typically, in a biopolymer processing context, diameters will range from 0.05 cm to 5 cm. In a synthetic polymer processing plant where the device may provide all or part of the detection portion of ACOMP the tubing will typically range from 1 cm to 50 cm. The length of the device will typically range from a minimum of 1 cm to 25 cm, but these ranges are only typical and not limiting.

Polarization considerations in the light scattering detectors. Preferably, but not limiting, the incident light source for the light scattering detector for Mw and Rg, and the light scattering detector for particle concentration determination will be linearly polarized. The direction of linear polarization, i.e. the orientation of the electric field vector, is parallel to the direction of the device's cylindrical axis. In the case of flow, this polarization direction is parallel or antiparallel to the flow. The detection means for the scattered light, such as apertures with optical fibers arrayed around the body of the tube then lie in what is commonly termed the 'scattering plane'; i.e. the plane perpendicular to the polarization direction. This is the plane in which maximum scattering occurs for small particles with isotropic polarizability, such as proteins and small aggregates of proteins. For such particles no light is scattered in the direction of the polarization direction. However, if the particle has optically anisotropic polarizability, for example, due to internal crystalline structure(s), or, possibly due to anisotropic morphology, or such as many small organic molecules have (e.g. toluene depolarizes initially linearly polarized light), then there will be scattering in the direction of the polarization direction. Depolarized scattering can also occur from large particles whose size approaches or surpasses the wavelength of the incident light.

Figure 10:
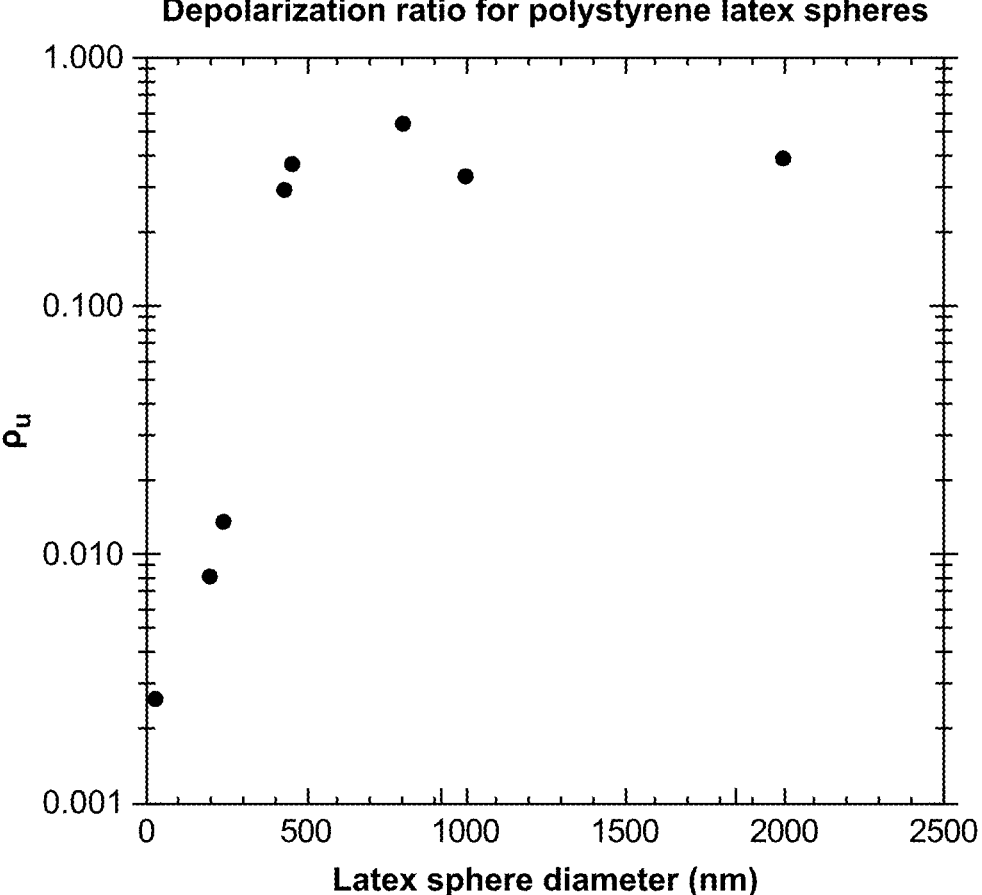
FIG. 10 illustrates the depolarization ratio $\rho_u$ from polystyrene latex spheres as a function of the sphere diameter, according to an example embodiment of the present disclosure.

As a further detector, hence, the device may also have i) a single or multi-angle depolarized light scattering detector for Mw and Rg, and/or ii) a single or multi-angle detector for particle counting and characterization. In some cases a single depolarized light scattering detector will be sufficient to both determine the ratio of depolarized to polarized scattering intensity and to count and/or characterize optically anisotropic/large particles. Under normal circumstances of protein experimentation and manufacture, for example, the protein and small aggregates will not depolarize incident linearly polarized light and there will be no detected signal on a depolarized light scattering detector. If depolarized light is detected during a process it signals that optically anisotropic or large particles have appeared in the protein solution. These optically anisotropic/large particles may be protein aggregates, particles with partial or full crystal structure, or be non-proteinaceous material, such as debris from filters, membranes, vessels, biological cell fragments, or other components in the experimental or manufacturing system. The depolarized light will be detected on both detectors i) and ii) or on a single detector used for both depolarized to polarized scattering intensity ratio and optically anisotropic/large particle counting and characterization. When detected on i) the ratio of depolarized to polarized scattering intensity can form the basis of a meaningful quality control criterion; i.e. it can be established that an acceptable protein solution will not have a depolarized to polarized scattering ratio surpassing a certain value, such as, not limiting, 0.05. Since the depolarized detector and the detector in the scattering plane will normally have different sensitivities, these can be calibrated to each others' sensitivity by scaling values of the depolarization ratio (total light scattered intensity in the polarization direction divided by total light scattered intensity in the scattering plane) by the known depolarization ratio of common liquids, such as, but not limited to, benzene, toluene, carbon disulfide, tetrachloride, etc. Calibration can also be made with colloids of known depolarization ratio suspended in aqueous solution, such as latex spheres, which can be traceable to the U.S. National Institute of Science and Technology. For example, FIG. 10 depicts the depolarization ratio $\rho_u$ from polystyrene latex spheres as a function of the sphere diameter. The abrupt onset of strong depolarization at around 200 nm is due to crystallinity of the polystyrene. The depolarization ratio is the total intensity scattered perpendicular to the scattering plane (the depolarized component) to the total intensity scattered in the scattering plane (i.e. the plane perpendicular to the electric field linear polarization vector). When detected on detector ii) that detector will be able to uniquely measure the number concentration n of particles (# of particles/cm³) that are optically anisotropic or large. This can be compared to the number concentration of all particles detected by polarized scattering by the particle concentration detector whose incident polarization state is parallel to the device cylindrical axis, and hence the fraction of particulates that are optically anisotropic or large can be determined. This can also form an acceptability criterion; e.g. not limiting, total particulate count should not exceed, say, 10⁴ particles/cm, and, not limiting, optically anisotropic/large particles should not exceed 103 particles/cm³.

Estimation of aggregate concentration $C_A$ and aggregate mass fraction $f_A$ from light scattering $R_g$ and $M_w$.

An important quantity in protein drug quality control is the concentration of aggregates, $C_A$, or similarly, the mass fraction of aggregates $f_A$. While the current device provides for determination of weight average molecular weight $M_w$ and the square root of the z-average mean square radius of gyration, $R_g = \langle S^2 \rangle_z^{1/2}$ of all scatterers in solution and the light scattering particle detector gives number concentration of particles n, and some characterization of these particles according to the LSS peak height distribution, none of these measurements yields the mass concentration of aggregates. Typically, the best way to determine aggregate concentration $C_A$ (in g/cm³ or other concentration units) is to use fractionation by chromatography, such as gel permeation chromatography (GPC). This method, however, is time consuming (typically ten minutes for a single measurement), cannot be used to perform continuous online monitoring, and requires discrete sample injection into the apparatus. Also, the associated apparatus is delicate, expensive, and labor intensive to maintain and operate. Furthermore, interactions of protein aggregates with the GPC columns can lead to adhesion of aggregates to the column or blocking of aggregates from eluting off the column, leading to an underestimate of aggregate content, or the column can break up aggregates, likewise leading to underestimates of aggregate concentration, or the column can concentrate proteins to produce artefactual aggregates, and other unwanted column-protein interactions can occur.

In the current device the simultaneous measurement of $M_w$ and $R_g$ allows estimates of aggregate concentration under certain assumptions. For example, $M_w$ and $R_g$ may be computed from multi-angle light scattering by common methods. In practice, and with orthogonal methods such as GPC, empirical relations between $M_w$ and $R_g$ can be developed to assess aggregate concentration. It should be noted that without any models or empirical relationships the qualitative type of aggregates can immediately be determined. If the aggregates forming in a process are a large population of small aggregates (e.g. dimer, tetramers, etc.) then the measured $R_g$ will not change appreciably even though $M_w$ steadily increases. This is because $R_g$ for small aggregates is not much larger than for the native protein, and typical native proteins of $R_g$ around 5 nm (e.g. this would correspond to a dynamic light scattering hydrodynamic radius of about 6.5 nm) do not have a detectable angular dependence with a typical MALS instrument. On the other hand, if the aggregates are a small population of massive particles then $R_g$ will quickly become measurable as the light scattering intensity becomes angle dependent. It is surmised that if a typical protein is heated to a given temperature that a large population of small aggregates will begin to form so that $R_g$ would remain essentially constant while $M_w/M_o$ increases measurably. In contrast, it is surmised that if aggregation due to stirring a protein with a stir bar is monitored a small population of large particles will be produced, due to the localized mechanical effects and interfacial effects, so that $R_g$ will grow rapidly as $M_w/M_o$ increases.

Here, one example of how $M_w$ and $R_g$ can be correlated to obtain an estimate of aggregate concentration is given. For simplicity the following notation is adopted:

The following identifies quantities in the aggregation process measured from MALS data, quantities known about the protein and solution, and the unknowns, and relates these to the subpopulations of native proteins and aggregates. These allow an assessment of how the angular dependent scattering should evolve during different types of aggregation processes, and set the stage for the later goal in the work of providing rough estimates of the mass fraction of a protein solution population in the form of aggregates, vis-à-vis the fraction of native proteins in the solution population.

It is first noted that LPS and SPL are opposite, limiting paradigms for protein aggregation. The formation of SPL somewhat resembles chain growth polymerization in that the polymer population (the large aggregates) are widely separated from the monomer population in mass. In contrast, LPS resembles step growth polymerization, in that dimers, trimers, etc. make up part of the increasing polymer population, and are not far removed from native protein mass.

In either case it is possible to separate out the native protein concentration, molar mass, and size from the same characteristics of the aggregate population, with the understanding that for SPL this separation is stark and lends itself to certain further approximations (discussed below), and that for LPS the separation is less meaningful and might better be dispensed with in favor of a stepgrowth model (also discussed below).

The known quantities are:

$C_T$=total concentration of protein and aggregates in solution $M_o$=the molar mass of the native protein $R_o$=the root means square radius of gyration of the native protein (e.g. determined from $R_H$)

The measured quantities at each point in time are:

$<S^2>_z$(t)=the mean square radius of gyration of the entire protein population at time t $M_w$(t)=the weight average molar mass of the entire protein population at time t The three unknown quantities of importance are:

$M_{A,w}$(t)=weight average molar mass of aggregate population at time t $R_{z,A}$(t)=root mean square radius of gyration of the aggregate population at time t $C_o$(t)=mass concentration of native protein at any time t The mass concentration of aggregates $C_A$(t) is obtained from mass balance and $C_o$(t) by $C_T$=$C_o$(t)+$C_A$(t).

It is also convenient to express the mass fraction of aggregate, f, f=$C_A$(t)/$C_T$.

Since the Zimm equation will furnish $M_{A,w}$(t) and $R_{z,A}$(t) one more condition is needed to find $C_A$(t). GPC is frequently used for determining this directly, with various caveats. Otherwise, assumptions and/or models are needed. This is addressed later.

The following simplifications in notation will be used:

$$C \equiv C_T \quad \text{(known)}$$

$$R \equiv \langle S^2 \rangle_z^{1/2}(t) \quad \text{(measured)}$$

$$R_A \equiv \langle S^2 \rangle_{z,A}^{1/2}(t) \quad \text{(unknown)}$$

$$M \equiv M_w(t) \quad \text{(measured)}$$

$$M_A \equiv M_{A,w}(t) \quad \text{(unknown)}$$

$$C_o \equiv C_o(t) \quad \text{(unknown)}$$

$$C_A \equiv C_A(t) \quad (C_T = C_o(t) + C_A(t))$$

Let s(M)dM be the mass concentration (g/cm$^3$) of the protein population between masses M and M+dM. Then:

$$s(M) = C_o \delta(M - M_o) + s_A(M) \tag{1}$$

where $\delta(M-M_o)$ is the Delta function with units of inverse molar mass, and $S_A$(M)dM is the mass concentration of aggregates between masses M and M+dM. Using the simplified notation above, $M_w$(t) is given by:

$$M = \frac{\int M(C_o \delta(M - M_o) + s_A(M))dM}{C} = \tag{2}$$

$$\frac{M_0 C_0 + \int M s_A(M) dm}{C} = \frac{M_0 C_0 + M_A C_A}{C}$$

Similarly $<S^2>_z$(t) is given by:

$$R^2 = \frac{\int R^2 M s(M) dM}{\int M s(M) dM} = \tag{3}$$

-continued $$\frac{R_0^2 M_0 C_0 + \int R^2 M s_A(M) dM}{M_0 C_0 + M_A C_A} = \frac{R_0^2 M_0 C_0 + R_A^2 M_A C_A}{MC}$$

Letting f=$C_A$/C be the fraction of the total protein population in aggregate form, allows equation 3a to be re-written as:

$$R^2 = \frac{R_0^2 M_0 (1 - f) C_0 + R_A^2 M_A f}{M} \tag{4}$$

Consider the case where the Zimm approximation is used:

$$\frac{KC_T}{R(t)} = \frac{1}{M_w(t)}\left(1 + \frac{q^2 \langle S^2 \rangle_z(t)}{3}\right) + 2A_2 C_0(t) \tag{5}$$

If $A_2$ is neglected in the first approximation then the angular extrapolation of $KC_T$/R yields both $M_w$(t) (M) and $<S^2>_z$(t) ($R^2$). Combining (2) and (3) gives an expression for f, involving the two unknowns $M_A$ and $R_A^2$.

$$f = \frac{MR^2 - M_o R_o^2}{M_A R_A^2 - M_o R_o^2} \tag{6}$$

One cannot proceed further without assumptions on the scaling relation between $M_A$ and $R_A^2$ and the limit of small f.

Distinguishing large populations of small scatterers from small populations of large scatterers via the evolution of angular dependence of light scattering.

A Computed Example

Figure 11:
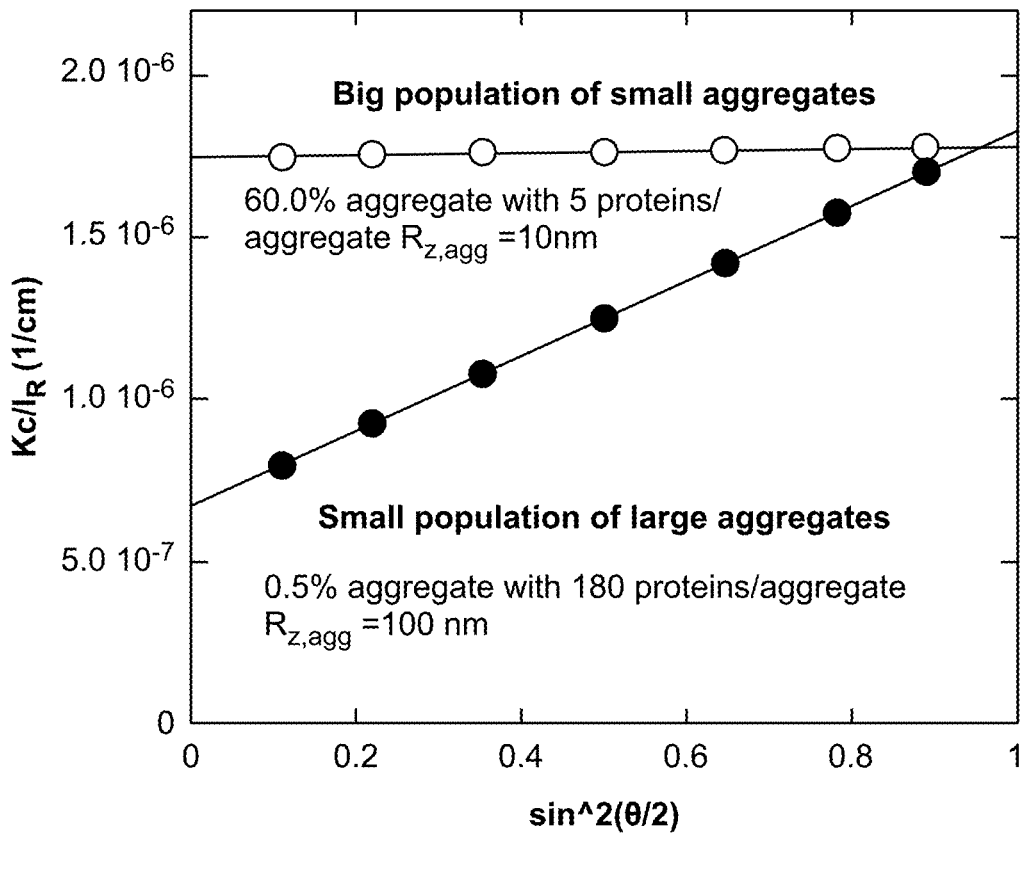
FIG. 11 illustrates seven computed angle scattering patterns for a large population of small aggregates and a small population of large aggregates, according to an example embodiment of the present disclosure.

To visualize differences in angular dependent light scattering for the two limiting cases, SPL and LPS for some specific values are used in FIG. 11, assuming values for f, $M_A$, and $R_A$. FIG. 11 shows the computed contrast in scattering between two arbitrary but illustrative LPS and SPL. The native protein, taken as BSA, has $M_o$=66,500 g/mole and a radius of gyration $R_g$=4 nm. In FIG. 11 the LPS is taken to contain a high mass fraction, 60%, of aggregates with an average of five proteins per aggregate and $R_A$=10 nm. This leads to M=226,000 and R=9.5 nm, from equations (5) and (6), and the zero slope Kc/I angular dependence seen in FIG. 11. The discrete data points shown correspond to the seven angles used in the multi-angle light scattering instrument (MALS).

The SPL is assumed to have a 0.05% mass fraction of aggregates with $R_A$~100 nm, with 15,000 proteins per aggregate, using a spheroidal type aggregation, R~$M^{1/3}$. This leads to M=565,000 g/mole and R=94 nm, from equations (5) and (6), and the steep slope for the Kc/I angular dependence seen in FIG. 11.

($R_g$~0.7$D_H$ in the non-draining limit of a random coil).[i] Using equation (3) and (4) then yields the scattering envelope in FIG. 11 with zero slope.

Figure 12:
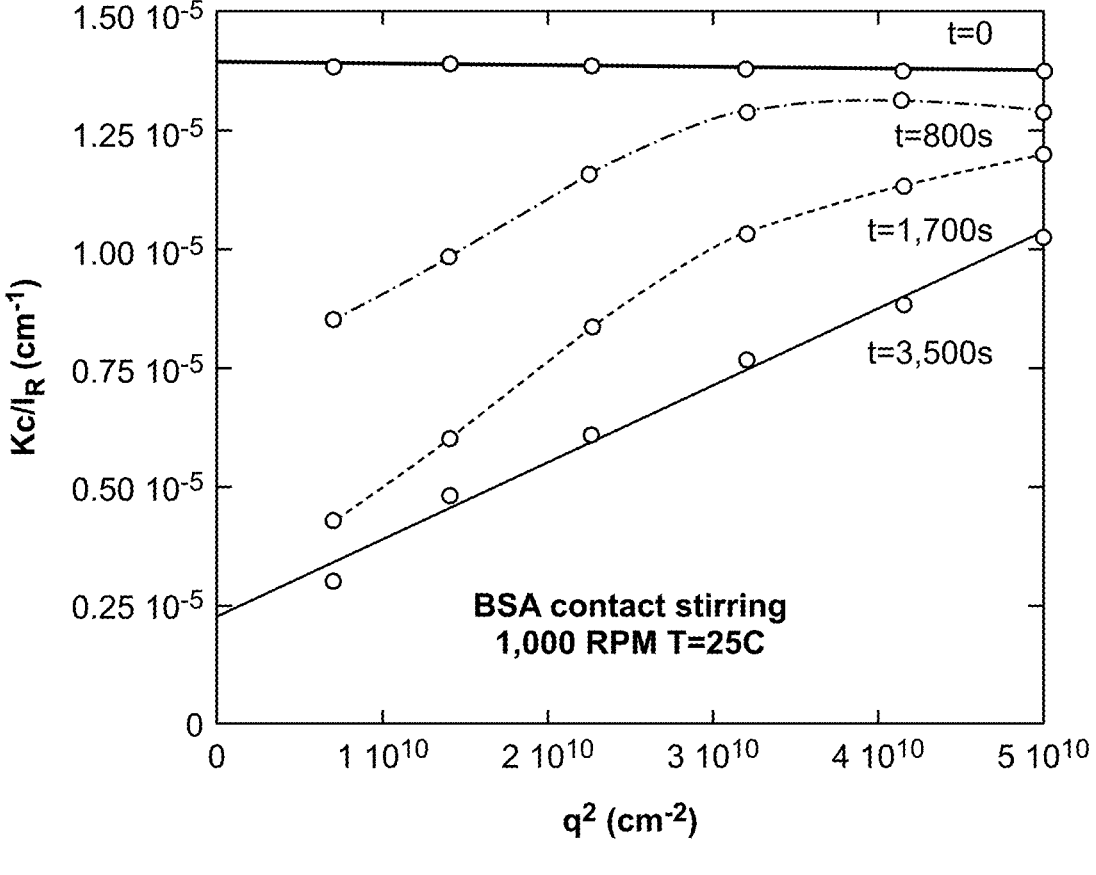
FIG. 12 illustrates multi-angle light scattering data depicting how a native protein (bovine serum albumen, BSA) with an initially small size, an $R_g$=4 nm, and zero slope acquires a small population of large aggregates under contact-stir with a Teflon stir bar in a glass scattering cell at 1,000 RPM at T–25° C., according to an example embodiment of the present disclosure.
Figure 13:
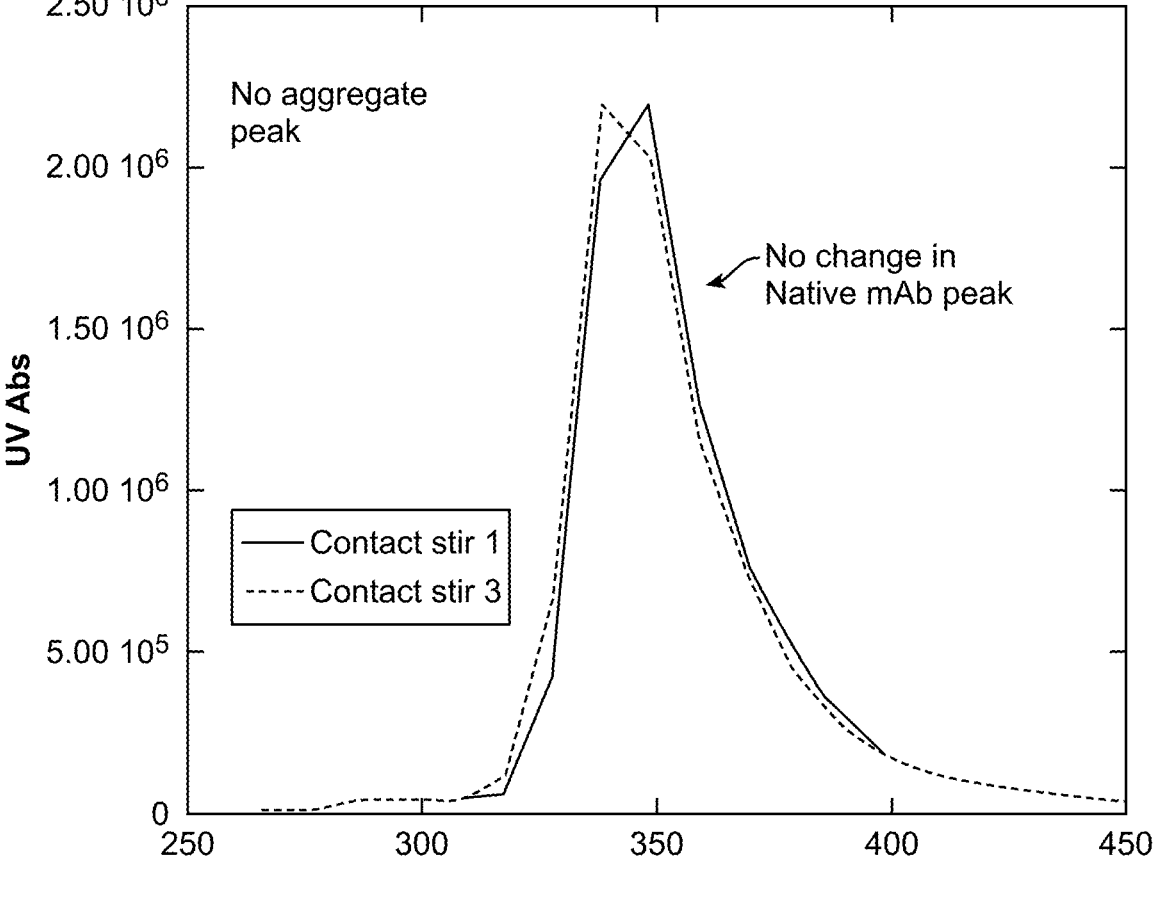
FIG. 13 illustrates Size Exclusion Chromatography (SEC) data showing that there is no detectable loss of native protein after the stir-contact ends for the system depicted in FIG. 12, according to an example embodiment of the present disclosure.
Figure 14:
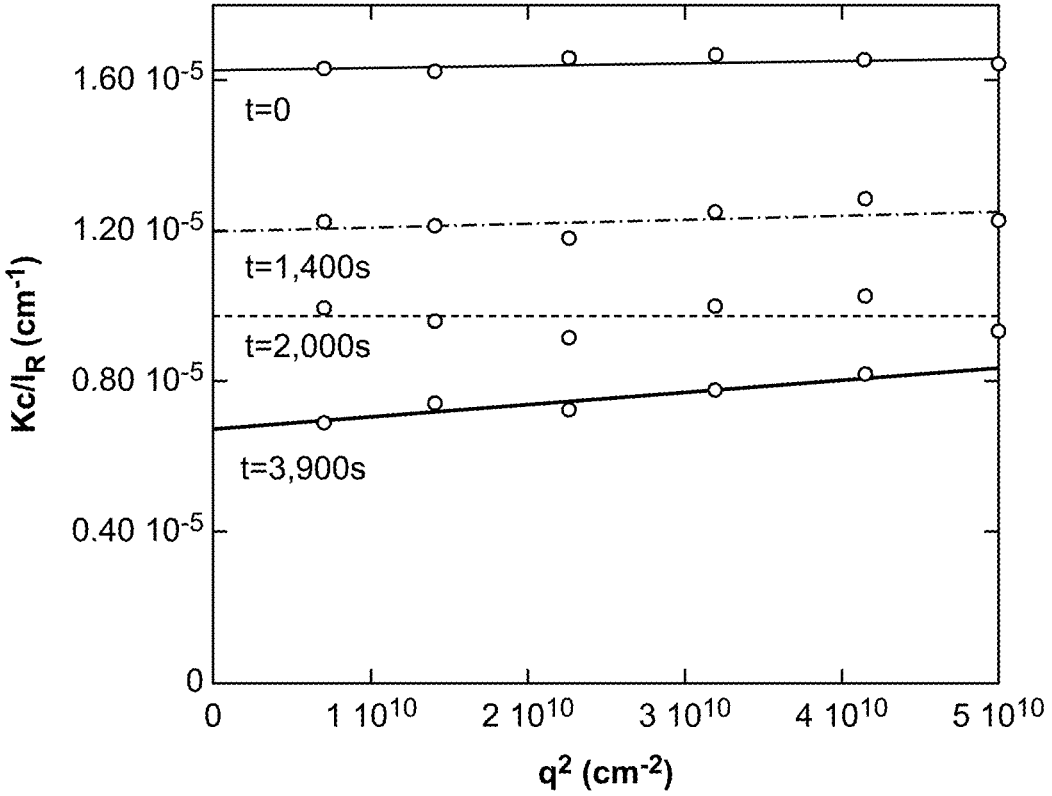
FIG. 14 illustrates multi-angle scattering data showing the thermally induced aggregation of BSA at T=58° C., according to an example embodiment of the present disclosure.
Figure 15:
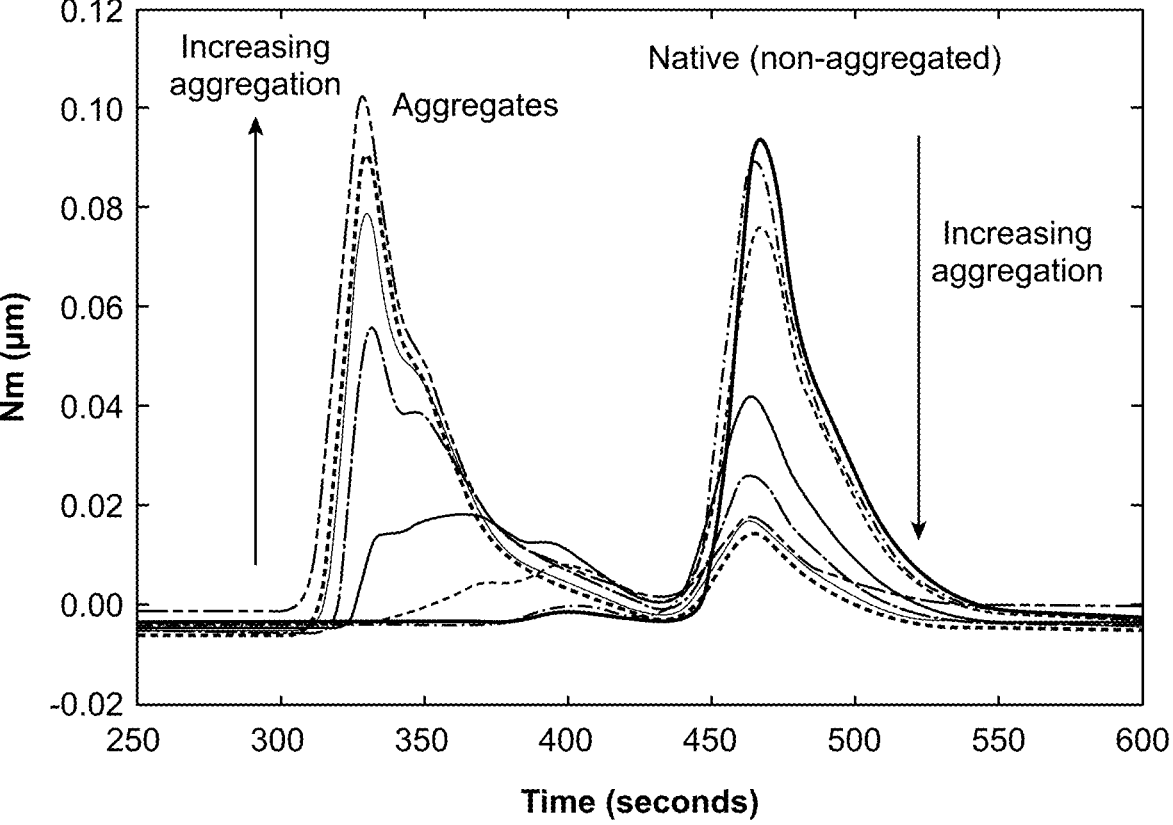
FIG. 15 illustrates SEC data from aliquots of the BSA undergoing thermally induced aggregation from the system shown in FIG. 14.

Distinguishing Large Populations of Small Aggregates from Small Populations of Large Aggregates While aggregates are undesirable in protein and other solutions, the size of the aggregates is important. Nanometer scale particles vs micron scale are quite different. The current device gathers and analyzes data that can provide a continuous record of particle characteristics. FIG. 11 illustrates seven computer angle scattering patterns for a large population of small aggregates and a small population of large aggregates. Taking the derivative of Equation 8 with respect to q2 allows <S2>z to be determined ($R_g$=<S2>z½). The slope, this derivative, is hence a direct measure of the z-average mean square radius of gyration of the particle populatin causing the scattering; the larger the slope the larger the particle. Zero slope, i.e. a horizontal line, indicates the scatterers are too small to measure with the method (typically they would be under about Rg of 10 nm). FIG. 12 illustrates actual multi-angle light scattering data showing how a native protein (bovine serum albumen, BSA) with an initially small size, an Rg=4 nm, and zero slope acquires a small population of large aggregates under contact-stir with a Teflon stir bar in a glass scattering cell at 1,000 RPM at T–25° C. FIG. 13 illustrates SEC data demonstrating that there is no detectable loss of native protein after the stir-contact ends for FIG. 12; i.e. the mass fraction of aggregates that causes the dramatic change in scattering slopes in FIG. 12 is so small that is undetectable by the widely used SEC method. FIG. 14 illustrates actual multi-angle light scattering data showing the thermally induced aggregation of BSA at T=58° C. At t=0 the native protein, prior to aggregation has zero slope. As aggregation proceeds the slope remains essentially zero while the increase of aggregate mass can be seen by the decrease in the y-axis intercept, which is the reciprocal of Mw. At the latest time the scattering has acquired some slope indicating Rg has increased to about 39 nm. FIG. 15 shows the SEC data from aliquots of the BSA undergoing thermally induced aggregation from the previous figure. The area under the aggregate and native peaks is directly proportional to the mass concentration of aggregates and native proteins, respectively. As aggregation proceeds the native peak converts into the aggregate peak. By the end there is very little native protein left, as the majority has been converted to aggregates. In contrast to the stir induced aggregation of BSA of FIG. 14, a large mass fraction of native protein is converted to aggregates under the thermal stress at T=58° C.

The invention claimed is:

1. A device comprising:
   a flow tube comprising an inner bore and an outer surface, the flow tube comprising a first end configured to connect to a first tube and a second end configured to connect to a second tube;
   an optical component tube comprising two or more detectors configured to monitor one or more process characteristics of a polymer containing liquid along a polymer production flow path containing the polymer containing liquid, the optical component tube having a body configured to receive the flow tube,
   wherein the optical component tube, with the flow tube inside, is configured to be inserted in the polymer production path without making contact with the polymer containing liquid,
   wherein an inner diameter of at least one of the first end or the second end of the flow tube substantially equals to an inner diameter of the first tube or the second tube,
   wherein the two or more detectors are spaced apart along the polymer production flow path and configured for measurements of the one or more process characteristics of the polymer containing liquid along the polymer production flow path.

2. The device of claim 1, wherein the flow tube is configured to be removably inserted into the polymer pro-duction flow path of the polymer containing liquid for monitoring the polymer containing liquid without substantially disturbing flow of the polymer containing liquid, wherein the flow tube is configured to be releasably attached to the body of the optical component tube.

3. The device according to claim 2, wherein the flow tube contains one or more windows permitting light to pass from the inner bore to the outer surface of the flow tube.

4. The device according to claim 2, wherein the flow tube comprises a transparent material and is configured to permit light to pass to and from the inner bore to the outer surface.

5. The device according to claim 2, wherein the flow tube comprises a disposable material and/or a sterilizable material.

6. The device according to claim 1, wherein the optical component tube comprises one or more light sources.

7. The device according to claim 6, further comprising one or more lens assemblies configured to manipulate a beam produced by the one or more light sources.

8. The device according to claim 1, wherein the polymer containing liquid is a biopolymer solution, and the two or more detectors are configured to monitor one or more of Mw, $R_g$, concentration of biopolymer, unfolding of the biopolymer in time, change of molecular weight of the biopolymer in time, conformational change of the biopolymer, total solution viscosity, biopolymer intrinsic viscosity, degradation or aggregation,
   rate of aggregation or degradation of the biopolymer, mechanism causing the molecular weight of the biopolymer to change, number concentration of subvisible particles, early detection of changes in molecular weight, presence and of anisotropic or large particles, number concentration of anisotropic or large particles, and a fraction of biopolymer mass in aggregated form.

9. The device according to claim 1, wherein the one or more process characteristics is selected from the group consisting of concentration of biopolymer, unfolding of the biopolymer in time, change of molecular weight of the biopolymer in time, degradation or aggregation, rate of aggregation or degradation of the biopolymer, mechanism causing the molecular weight of the biopolymer to change, number concentration of subvisible particles, early detection of changes in molecular weight, total solution viscosity, biopolymer intrinsic viscosity, biopolymer radius of gyration, and a fraction of biopolymer mass in aggregated form.

10. The device according to claim 1, wherein the two or more detectors are selected from the group consisting of a single angle or a multiple angle light scattering (MALS) detector, a depolarized scattering detector, a particle counter, a dynamic light scattering (DLS) detector, an ultraviolet (UV) absorption detector, a fluorescence detector, and a viscosity detector.

11. The device according to claim 1, further comprising a computing and analysis device, communicatively coupled with the two or more detectors, the computing and analysis device configured to determine one or more process characteristics of the polymer containing liquid.

12. The device according to claim 1, further comprising one or more scattering light detection fibers.

13. The device according to claim 1, further comprising one or more band pass filters.

14. The device according to claim 1, wherein the two or more detectors are configured to share the polymer production flow path without any intervening fluid fittings or connector pieces, and wherein there is no sample chamber.

15. The device according to claim 1, further comprising one or more beam dumps or beam stops.

16. The device according to claim 1, wherein the optical component tube comprises one or more releasable connections that allow one or more modular detector rings to interlock or attach sufficiently.

17. The device according to claim 1, wherein the two or more detectors comprises two or more modular detector rings that are configured for measurements of the one or more process characteristics of the polymer containing liquid along the polymer production flow path.

18. The device of claim 1, wherein the flow tube is configured to be a first portion of the polymer production flow path to receive the polymer containing liquid in the inner bore.

19. The device of claim 1, wherein the first tube is configured to be a second portion of the polymer production flow path to introduce the polymer containing liquid into the flow tube, wherein the second tube is configured to be a third portion of the polymer production flow path to provide an exit path of the polymer containing liquid.

20. The device of claim 1, wherein the flow tube, the first tube, and the second tube are substantially parallel to the polymer production flow path and receive the full polymer production flow.

* * * * *